(12) United States Patent
Petersson et al.

(10) Patent No.: US 8,045,259 B2
(45) Date of Patent: Oct. 25, 2011

(54) ACTIVE OPTICAL FIBERS WITH WAVELENGTH-SELECTIVE FILTERING MECHANISM, METHOD OF PRODUCTION AND THEIR USE

(75) Inventors: Anders Petersson, Lund (SE); Jes Broeng, Birkerød (DK); René Engel Kristiansen, Vaerloese (DK)

(73) Assignee: NKT Photonics A/S, Birkerod (DK)

( * ) Notice: Subject to any disclaimer, the term of this patent is extended or adjusted under 35 U.S.C. 154(b) by 404 days.

(21) Appl. No.: 12/085,190

(22) PCT Filed: Nov. 20, 2006

(86) PCT No.: PCT/DK2006/000646
§ 371 (c)(1),
(2), (4) Date: May 19, 2008

(87) PCT Pub. No.: WO2007/057024
PCT Pub. Date: May 24, 2007

(65) Prior Publication Data
US 2009/0168149 A1    Jul. 2, 2009

(30) Foreign Application Priority Data

Nov. 18, 2005  (DK) .................................. 2005 01617

(51) Int. Cl.
*H04B 10/17* (2006.01)
*G02B 6/036* (2006.01)
*G02B 6/134* (2006.01)
*H04B 10/12* (2006.01)

(52) U.S. Cl. .................. 359/337.2; 359/341.1; 385/126

(58) Field of Classification Search ............... 359/337.2, 359/341.1; 385/126
See application file for complete search history.

(56) References Cited

U.S. PATENT DOCUMENTS
5,067,789 A    11/1991  Hall et al.
(Continued)

FOREIGN PATENT DOCUMENTS
JP           56-006202           1/1981
(Continued)

OTHER PUBLICATIONS

Wang et al. "Three-level neodymium fiber laser incorporating photonic bandgap fiber", Optics Letters, vol. 31, No. 10, pp. 1388-1390 (May 15, 2006).*

(Continued)

*Primary Examiner* — Eric Bolda
(74) *Attorney, Agent, or Firm* — Buchanan Ingersoll & Rooney PC

(57) ABSTRACT

The invention relates to optical fibers for use in optical amplification of light, such as in optical fiber amplifiers and lasers and for use in delivery of high power light, in particular to a scheme for reducing amplified spontaneous emission at undesired wavelengths. The invention further relates to articles, methods and use. An object of the invention is achieved by a micro-structured optical fiber, which is adapted to guide light by the photonic bandgap effect and to have one or more pass bands and at least one stop-band over a wavelength range from $\lambda_{stop1}$ to $\lambda_{stop2}$. In an aspect of the invention, the at least one stop-band provides filter functions that suppress nonlinear effects. In another aspect, the core region is actively doped, and the active material has an emission spectrum with a higher value of the emission cross section $\sigma_E$ at a wavelength $\lambda_{ASE}$ between $\lambda_{stop1}$ and $\lambda_{stop2}$ than outside said wavelength range such that amplified spontaneous emission and lasing within the wavelength range from $\lambda_{stop1}$ to $\lambda_{stop2}$ is reduced. In still another aspect, the optical fiber exhibits photonic bandgaps at different wavelength ranges in different radial directions of a cross section of the optical fiber.

15 Claims, 18 Drawing Sheets

U.S. PATENT DOCUMENTS

| | | | |
|---|---|---|---|
| 5,155,792 | A | 10/1992 | Vali et al. |
| 5,471,553 | A | 11/1995 | Teshima |
| 5,696,782 | A * | 12/1997 | Harter et al. ............ 372/25 |
| 5,761,234 | A * | 6/1998 | Craig et al. ............ 372/75 |
| 5,907,652 | A | 5/1999 | DiGiovanni et al. |
| 6,987,783 | B2 * | 1/2006 | Fajardo et al. ............ 372/6 |
| 7,340,140 | B1 * | 3/2008 | Xu et al. ............ 385/125 |
| 2003/0117699 | A1 | 6/2003 | Maroney et al. |
| 2003/0165313 | A1 * | 9/2003 | Broeng et al. ............ 385/125 |
| 2005/0105867 | A1 * | 5/2005 | Koch et al. ............ 385/125 |
| 2006/0263024 | A1 * | 11/2006 | Dong et al. ............ 385/125 |

FOREIGN PATENT DOCUMENTS

| | | |
|---|---|---|
| JP | 57-041602 | 3/1982 |
| JP | 59-217632 | 7/1984 |
| JP | 08-119656 | 5/1996 |
| WO | WO 98/36300 | 8/1998 |
| WO | WO 99/64904 | 12/1999 |
| WO | WO 00/60388 | 10/2000 |
| WO | WO 02/26648 | 4/2002 |
| WO | WO 02/088802 | 11/2002 |
| WO | WO 02/101429 | 12/2002 |
| WO | WO 03/019257 | 3/2003 |
| WO | WO 03/079077 | 9/2003 |
| WO | WO 03/080524 | 10/2003 |
| WO | WO 2005/059612 | 6/2005 |

OTHER PUBLICATIONS

Agrawal et al., "Fiber-Optic Communication Systems" Optical Amplifiers, 2nd Edition, 1997, pp. 380-381.

Argyros et al., "Guidance Properties of Low-Contrast Photonic Bandgap Fibers" Optics Express, 2005, vol. 13, No. 7, pp. 2503-2511.

Barnes et al., "Absorption and Emission Cross Section of $Er^{3+}$ Doped Silica Fibers" IEEE Journal of Quantum Electronics, 1991, vol. 27, No. 4, pp. 1004-1010.

Bjarklev et al., "Fabrication of Photonic Crystal Fibres" Kluwer Academic Press, 2003, pp. 116-130.

Bouwmans et al., "Fabrication and Characterization of an all-Solid 2D Photonic Bandgap Fiber with a Low-Loss Region (< 20 dB/km) Around 1550nm" Optics Express, 2005, vol. 13, No. 21, pp. 8452-8459.

Bristow et al., "Reflection and Emission of Brillouin Zone Edge States for Active Photonic Crystal Waveguides" Journal of Optics, 2005, vol. 7, No. 6, pp. S270-S275.

Digonnet, "Rare-Earth-Doped Fiber Lasers and Amplifiers" $2^{nd}$ Edition, 2001, Marcel Dekker, Inc., New York-Basel, pp. 145.

Romanov et al., "Anisotropic Photoluminescence in Incomplete Three-Dimensional Photonic Band-Gap Environments" Applied Physics Letters, 1999, vol. 74, No. 13, pp. 1821-1823.

Romanov et al., "Light Emission From Thin Opaline Photonic Crystals of Low and High Dielectric Contrast" Synthetic Metals, 2001, vol. 124, pp. 131-135.

* cited by examiner

ACTIVE OPTICAL FIBERS WITH WAVELENGTH-SELECTIVE FILTERING MECHANISM, METHOD OF PRODUCTION AND THEIR USE

TECHNICAL FIELD

The present invention is in the field of optical waveguides and relates in particular to optical waveguides for use in optical amplification of light, such as in optical fiber amplifiers and in optical fiber lasers, and for use in delivery of high power light.

BACKGROUND ART

Optical fiber waveguides, which are able to amplify light have been explored over the last decades for a number of applications (see e.g. Michel J. F. Digonnet, ed., "Rare-Earth-Doped Fiber Lasers and Amplifiers", $2^{nd}$ edition, 2001, Marcel Dekker, Inc., New York-Basel, referred to elsewhere in this application as [Digonnet]). For optical communication systems, for example, fiber optical amplifiers are used, where Erbium ions are incorporated into an optical fiber to provide amplification of light around 1.5 µm. For amplification at other wavelengths other rare-earths, such as Yb, Nd, Ho, Tm, and others are used. Other means of amplification than using rare-earth ions are also possible, for example by filling active material in voids of so-called photonic crystal fibers (also known as micro-structured fibers, holey fibers, hole-assisted fibers, photonic bandgap fibers), see e.g. Bjarklev, Broeng, and Bjarklev in "Photonic crystal fibres", Kluwer Academic Press, 2003 (referred to elsewhere in this application as [Bjarklev et al.]) for a general introduction to the design, manufacturing and properties of these fibers. In general, there is a need to control the spectrum of amplified light in an optical amplifier. In this application, the invention is exemplified using rare-earth doped optical fibers, but the concepts and ideas also cover other types of amplifying optical waveguides.

In a fiber amplifier, active ions are pumped by an optical source to an excited energy level and through stimulated emission amplification takes place. The amplified wavelength(s) can be controlled through an input (or seed) signal and/or it can be controlled by feedback mechanisms such as wavelength selective mirrors in a laser cavity. However, the available wavelengths for amplification are limited by the available emission spectrum of the specific rare-earth ions. The emission spectrum of a given rare-earth ion depends to some degree on the exact host material that it is incorporated into—and over the past decade significant resources has been spent on investigating various rare-earths and host compositions to provide desired emission spectra (and absorption spectra to suit desired pump sources), cf. e.g. [Digonnet], chapter 2.

One common problem for optical amplifiers is that it is difficult to obtain amplification for parts of the emission spectrum, where the emission cross-sections of rare-earth ions are significantly below their peak values. The problem is that amplified spontaneous emission at undesired wavelengths (where the emission cross-sections are high) can dominate over the stimulated emission at a desired (e.g. signal) wavelength (with a lower emission cross-section). For example, for Yb doped fibers it is in practice difficult to obtain amplification at wavelengths above 1100 nm, and in particular for wavelengths above 1200 nm, as amplified spontaneous emission in the wavelength range around 1030 nm-1070 nm builds up and de-excite the Yb ions (cf. e.g. FIG. 4). Another example is Yb doped fiber amplifiers that are desired for amplification around 980 nm, where amplified spontaneous emission around 1030 nm-1070 nm also plays a limiting factor. Another example is ErYb doped fibers, where desired amplification around 1.5 µm is limited by amplified spontaneous emission from the Yb ions. In general, the amplified spontaneous emission can develop into lasing at undesired wavelength(s) in fiber configurations with optical feedback mechanisms.

A typical solution to suppress undesired amplified spontaneous emission in optical amplifiers is to divide the optical fiber amplifier into a number of amplifier stages, where optical filters, which filter out amplified spontaneous emission, are inserted between the amplifier stages. It is, however, a disadvantage that multiple optical components are required to filter away the undesired amplified spontaneous emission. Further, there are in practice limits to power levels and wavelengths that can be obtained in this way. These practical limits are governed by filtering efficiency and differences in emission cross-sections at undesired and desired wavelengths.

[Argyros et al.] (Argyros et al. in Optics Express, Vol. 13, No. 7, 4 Apr. 2005, pp. 2503-2511) describe guidance properties of low-contrast, passive PBG fibers.

WO-03/019257 describes an optical fiber comprising a core (e.g. a low-index feature, e.g. a void) an outer air-clad layer for providing a high NA and a number of periodically distributed cladding features in an inner cladding to provide light guidance due to the PBG-effect. In an embodiment, the optical fiber comprises an optically active material whereby the optical fiber may be used for optical amplification or for lasing. The PBG guidance may be used to enhance specific parts of the amplifier spectrum by placing a bandgap edge at a frequency within the emission spectrum of the active ion (cf. FIG. 28 in WO-03/019257).

[Bouwmans et al.] (Bouwmans et al. in Optics Express, Vol. 13, No. 21, 17 Oct. 2005, pp. 8452-8459) describe a solid core photonic bandgap fiber.

DISCLOSURE OF INVENTION

The present invention provides improved active, optical fibers for use as amplifying medium in amplifier and laser applications, where amplified spontaneous emission at undesired wavelengths is reduced or preferably suppressed. This allows more efficient amplification at desired wavelengths.

Optical Fiber

The present inventors have realized that by providing PBG fibers with active core and/or cladding material and by adapting design parameters, it is possible to realize an efficient gain fiber for amplifiers and lasers at wavelengths $\lambda_s$ that are not— or less—accessible for conventional fibers (standard (non-micro-structured fibers) as well as many micro-structured fibers).

In an aspect of the invention, this is achieved by arranging the fiber to have a core region comprising a core region material, surrounded by a cladding region comprising solid or liquid micro-structural elements embedded in a cladding background material and extending in a longitudinal direction of the optical fiber, and arranging that the said core and/or cladding region—at least over a part of its/their spatial extension (radially as well as longitudinally)—comprise(s) active material that allows for optical amplification, and that the fiber is adapted to guide light by the photonic bandgap effect and to have at least one stop-band over a wavelength range (e.g. from $\lambda_{stop1}$ to $\lambda_{stop2}$), and arranging that the active material—when located in the core region material and/or in the cladding background material (and/or in the material constituting the micro-structural elements)—has an emission spectrum with a higher value of the emission cross section σ at a wavelength $\lambda_{ASE}$ in the stop-band than outside said stop-band such that amplified spontaneous emission and lasing in the stop-band is reduced, preferably suppressed or eliminated.

In an embodiment, the optical fiber is adapted to amplify and guide light at a signal wavelength and wherein $\lambda_s$ is located outside the stop-band.

In an aspect of the invention, an object of the invention is achieved by an optical fiber for amplification of light at a signal wavelength, $\lambda_s$, the optical fiber defining a longitudinal direction, the optical fiber comprising
- a core region for propagating light at said signal wavelength in a longitudinal direction of said optical fiber, the core region comprising a core region material,
- a cladding region surrounding said core region, said cladding region comprising micro-structural elements embedded in a cladding background material and extending in said longitudinal direction, and
- said core region at least over a part of its longitudinal and cross sectional extent comprising active material that allows optical amplification, and said fiber being adapted to guide light by the photonic bandgap effect defined by its transmission spectrum comprising separate ranges of wavelengths constituting one or more pass bands exhibiting relatively high transmission and one or more stop bands exhibiting relatively low transmission, such that amplified spontaneous emission and lasing in said one or more stop bands is reduced, and wherein $\lambda_s$ is located in a pass band.

In an embodiment, the active material when located in said core region material has an emission spectrum with a higher value of the emission cross section $\sigma_E$ at a wavelength in a stop band (reflecting said 'undesired wavelengths') than at $\lambda_s$. In an embodiment, $\sigma_E(\lambda_s)$ is smaller than a value of the emission spectrum in a neighbouring stop band at a wavelength, where it is desired to reduce amplified spontaneous emission (ASE). The stop band is e.g. defined by the wavelength range between a lower wavelength end point $\lambda_{stop1}$ and an upper wavelength end point $\lambda_{stop2}$ ($\lambda_{stop2} > \lambda_{stop1}$).

In an embodiment, the cladding region at least over a part of its longitudinal and cross sectional extent comprising active material that allows optical amplification.

In an embodiment, the core region material is a solid material at the normal temperatures of use. Alternatively, it may be a liquid material or a material that is curable to a solid material at the normal temperatures of use. In the following, optical fibers according to the invention are termed 'solid core' or 'solid fiber' in the meaning that the core and/or micro-structural elements comprise a solid or liquid (preferably high viscous) material (i.e. are not voids).

In an aspect of the invention, an object of the invention is achieved by an optical fiber for amplification of light, the optical fiber defining a longitudinal direction, the optical fiber comprising
- a core region for propagating light at said signal wavelength in a longitudinal direction of said optical fiber, the core region comprising a core region material,
- a cladding region surrounding said core region, said cladding region comprising micro-structural elements embedded in a cladding background material and extending in said longitudinal direction, and
- said core and/or cladding region at least over a part of their longitudinal and cross sectional extent comprise(s) active material that allows for optical amplification, and said fiber being adapted to guide light by the photonic bandgap effect and to have one or more pass bands and at least one stop-band over a wavelength range from $\lambda_{stop1}$ to $\lambda_{stop2}$, wherein
said active material (when located in said core region material and/or in said cladding background material) has an emission spectrum with a higher value of the emission cross section $\sigma_E$ at a wavelength $\lambda_{ASE}$ between $\lambda_{stop1}$ and $\lambda_{stop2}$ than outside said wavelength range such that amplified spontaneous emission and lasing within the wavelength range from $\lambda_{stop1}$ to $\lambda_{stop2}$ is reduced.

In an embodiment, the optical fiber is adapted to amplify and guide light at a signal wavelength $\lambda_s$ wherein $\lambda_s$ is located in a pass band in that $\lambda_s$ is smaller than $\lambda_{stop1}$ or $\lambda_s$ is larger than $\lambda_{stop2}$.

In an aspect of the invention, an object of the invention is achieved by an optical fiber for amplification of light at a signal wavelength, $\lambda_s$, the optical fiber defining a longitudinal direction and being adapted for propagating light at pump wavelength $\lambda_p$, the optical fiber comprising
- a core region for propagating light at said signal wavelength in a longitudinal direction of said optical fiber, the core region comprising a core region material,
- a cladding region surrounding said core region, said cladding region comprising micro-structural elements embedded in a cladding background material and extending in said longitudinal direction, and
- said core and/or cladding region at least over a part of their longitudinal and cross sectional extent comprise(s) active material that allows for optical amplification, and
- said fiber being adapted to guide light by the photonic bandgap effect and to have one or more pass bands and at least one stop-band over a wavelength range from $\lambda_{stop1}$ to $\lambda_{stop2}$, so that amplified spontaneous emission and lasing within the wavelength range from $\lambda_{stop1}$ to $\lambda_{stop2}$ is reduced wherein
$\lambda_s$ is located in a pass band in that $\lambda_s$ is smaller than $\lambda_{stop1}$ or $\lambda_s$ is larger than $\lambda_{stop2}$, and $\lambda_p$ is smaller than $\lambda_{stop1}$ or $\lambda_p$ is larger than $\lambda_{stop2}$, and
said active material when located in said core region material and/or in said cladding background material has emission and absorption spectra, $\sigma_E(\lambda)$ and $\sigma_A(\lambda)$, respectively, with values at the signal wavelength $\lambda_s$ for which the emission cross section $\sigma_E(\lambda_s)$ is larger than the absorption cross section $\sigma_A(\lambda_s)$.

In an embodiment, the transmission in a stop band is at least 10 dB/m lower than the transmission in a transmission band, such as at least 15 dB/m lower, such as at least 20 dB/m lower, such as at least 25 dB/m lower.

In an embodiment, the transmission in a stop band immediately neighboring said pass band wherein said signal wavelength $\lambda_s$ is located is at least 10/m dB lower than the transmission in said immediately neighboring transmission band, such as at least 15 dB/m lower, such as at least 20 dB/m lower, such as at least 25 dB/m lower.

In an embodiment, the emission cross sections $\sigma_E$ at the signal wavelength $\lambda_s$ is at least 10% larger than the absorption cross section $\sigma_A$, such as at least 25% larger, such as at least 50% larger, such as at least 100% larger, such as at least three times larger.

In an aspect of the invention, an object of the invention is achieved by an optical fiber defining a longitudinal direction, the optical fiber comprising a core region comprising a core region material comprising an active material for amplification of light at a signal wavelength, $\lambda_s$, and a cladding region surrounding said core region, said cladding region comprising micro-structural elements extending in said longitudinal direction, and said cladding region is adapted to reduce, preferably inhibit, propagation in said core region for a wavelength, $\lambda_{ASE}$, wherein $\lambda_{ASE}$ is different from $\lambda_s$, and an emission cross-section $\sigma_E$ of an atom of said active material when located in said core region material is larger at $\lambda_{ASE}$ than at $\lambda_s$ such that amplification at $\lambda_s$ is obtained substantially without amplified spontaneous emission or lasing at $\lambda_{ASE}$.

In an embodiment, the difference between the emission cross section $\sigma_E$ at a wavelength in a stop band is at least 50% larger than at the signal wavelength $\lambda_s$, such as at least 100% larger, such as at least three times as large, such as at least 5 times as large. In an embodiment, the 'wavelength in a stop band' is taken to be the wavelength $\lambda_{ASE}$ of maximum emission cross section in that stop band.

The optically active material of an optical fiber according to preferred embodiments of the present invention may be any convenient material (adapted to the host matrix material in question and to the relevant application and wavelength range), such as rare earth (e.g Er, Yb or ErYb, Nd, Ho, Tm, etc.) or transition metals (such as Fe, Ni, Co, etc.). The optically active material may e.g. be located in the core region (e.g. in a part of the core region). Alternatively—or additionally, the optically active material may be located in the cladding region (e.g. in a part of the cladding region). Additionally, it may be located in at least some of the micro-structural elements.

An optical fiber according to a preferred embodiment of the invention in the form of a double-clad structure is advantageous for providing a cladding pumping scheme. Preferably, the optical fiber is a double cladding fiber comprising a core for propagating signal light and an inner cladding for propagating pump light. The pump light may be coupled into the inner cladding by any appropriate means. However, non-axial coupling (e.g. side-coupling) is preferred in order to reduce the amount of pump light launched into the cladding elements (cf. e.g. WO-03/079077). Alternatively, an optical fiber according to a preferred embodiment of the invention may be adapted to allow core pumping.

Embodiments of the invention having a solid core and inner cladding may have the advantage of providing a simpler handling (splicing etc.), improved doping properties, etc.

Embodiments of the invention exhibit sharp 'filter' functions (due to the PBG effect) that may be arranged to suppress undesired parts of the emission spectrum, thereby facilitating amplification at long wavelengths (e.g. $\lambda$>1100 nm).

In an aspect of the invention, an object of the invention is achieved by an optical fiber defining a longitudinal direction, the optical fiber comprising a core region and a cladding region surrounding said core region, said cladding region comprising micro-structural elements extending in said longitudinal direction, said fiber being adapted to guide light by the photonic bandgap effect and to have one or more pass bands and at least one stop-band over a wavelength range from $\lambda_{stop1}$ to $\lambda_{stop2}$, wherein said at least one stop-band provides filter functions that suppress nonlinear effects.

Embodiments of the invention exhibit sharp 'filter' functions (due to the PBG effect) that may be arranged to suppress undesired nonlinear effects, such as stimulated Raman scattering (SRS), stimulated Brillouin scattering (SBS), self-phase modulation (SPM), solitons, four-wave-mixing (FWM), and/or other non-linear effects.

In a preferred embodiment, the optical fiber comprises two or more sections of separate PBG fibers having different band gaps, whereby the combined effect of the different band gaps result in a filtering function.

In a preferred embodiment, at least some of the sections are spliced together (e.g. by fusion splicing).

In a preferred embodiment, the optical fiber or at least one section of the optical fiber is tapered at least over a part of its longitudinal extension.

In a preferred embodiment, the optical fiber has a pass band of spectral width smaller than 50 nm, such as smaller than 30 nm, such as smaller than 10 nm, such as smaller than 5 nm, such as smaller than 1 nm, such as smaller than 0.5 nm, such as smaller than 0.1 nm, thereby facilitating suppression of nonlinear effects.

In a preferred embodiment, the optical fiber is a passive fiber used for delivery of high peak power, pulsed light, such as light with a peak power exceeding 1 kW.

In a preferred embodiment, the optical fiber is a passive fiber used for delivery of high power light, such as light with a power exceeding 5 W.

In a preferred embodiment, the optical fiber is an active fiber used for amplification of high peak power, pulsed light, such as light with a peak power exceeding 1 kW.

In a preferred embodiment, the optical fiber is an active fiber used for amplification of high power light, such as light with a power exceeding 5 W.

In a preferred embodiment, the optical fiber is a passive fiber used for delivery of high peak power, pulsed light at a center signal wavelength, $\lambda_s$, such as light with a peak power exceeding 1 kW, and the fiber is adapted to provide zero or anomalous dispersion at $\lambda_s$.

The filter function is determined from structural dimensions and is—for embodiments of the invention—less sensitive with respect to bending. This is an advantage for practical handling (e.g. in the mounting of a complete fiber amplifier or laser system).

Embodiments of the present invention may exhibit one or more of the following advantageous properties:

Provide ErYb amplifiers/lasers with suppressed amplified spontaneous emission (ASE) and lasing from Yb ions resulting in higher efficiency and power levels around 1.5 µm.

Facilitate efficient 980 nm amplifiers/lasers by suppressed ASE/lasing at longer wavelengths.

Use of higher order PBG regions for larger mode areas.

Increase powers of amplifiers, lasers and/or delivery systems by suppression of nonlinear effects.

The term that 'that amplified spontaneous emission and lasing in a stop band (e.g. within the wavelength range from $\lambda_{stop1}$ to $\lambda_{stop2}$ (or from $\lambda_{stop}(-)$ to $\lambda_{stop}(+)$, cf. FIG. 12a) is reduced' is in the present context taken to mean that amplified spontaneous emission and lasing is present to a smaller extent than would otherwise (i.e. in the absence of photonic bandgaps/stop bands) be the case. Preferably the amplified spontaneous emission and lasing is reduced by at least 10 dB/m, such as at least 15 dB/m, such as at least 20 dB/m, such as at least 25 dB/m, such as at least 30 dB/m. The reduction of the amplified spontaneous emission in the wavelength range in question is due to the leaking out of radiation from the region of spontaneous emission due to the absence of a photonic bandgap in that wavelength range.

The terms 'pass bands' and 'stop bands' are used interchangeably with wavelength ranges comprising a 'photonic bandgap' and wavelength ranges being 'anti-guiding', respectively. In general, the terms refer to the light guidance properties in a core region of the optical waveguide. The spectral position and extent of the pass and stop bands can be designed by adapting design parameters of the fiber in a given cross section of the fiber (optionally invariant over the length or optionally varying over the length of the optical fiber), including the refractive index profile of the micro-structural elements (e.g. voids, fluid-filled or solid (e.g. high-index) elements), their form, size and separation (including the pattern formed in the cross-section by their geometrical centres), the cladding background material, as well as the refractive index profile, structure, size and shape of the core region, cf. e.g. [Bjarklev et al.], chapter 6, WO-99/64904, WO-00/60388 or WO-02/101429.

In an embodiment, the distinction between adjacent (neighboring) pass and stop bands—as defined from a transmission spectrum—is defined by an intermediate wavelength range (from $\lambda_{pass}(+)$ to $\lambda_{stop}(-)$ or from $\lambda_{stop}(+)$ to $\lambda_{pass}(-)$, cf. FIG. 12$a$), wherein the transmission changes from a minimum level (cf. $<T_{pass}>$ in FIG. 12$a$) of the relatively high transmission level of a pass band to a maximum level of the relatively low transmission level (cf. $<T_{stop}>$ in FIG. 12$a$) of the neighboring stop band (or vice versa). A wavelength constituting an end-point of the wavelength range denoted a stop band (e.g. referred to as $\lambda_{stop1}$ or $\lambda_{stop2}$, cf. e.g. FIG. 12) or a pass band may be defined as any wavelength falling in the relevant intermediate wavelength range from e.g. $\lambda_{stop}(+)$ to $\lambda_{pass}(-)$, including the end points (as e.g. in FIG. 12$a$). The actual end point of a given pass or stop band may e.g. be chosen as an endpoint of the intermediate range. Alternatively, it may be chosen as the mid-point of the range ($[\lambda_{stop}(+)+\lambda_{pass}(-)]/2$). In an embodiment the wavelength range of a stop band is taken to be the range from $\lambda_{stop}(-)$ to $\lambda_{stop}(+)$ for that band. In an embodiment the wavelength range of a pass band is taken to be the range from $\lambda_{pass}(-)$ to $\lambda_{pass}(+)$ for that band.

In an embodiment, the optical fiber is adapted for propagating light at a pump wavelength $\lambda_p$. In an embodiment, the core region is adapted for propagating light at said pump wavelength $\lambda_p$.

In applications using cladding-pumping it may be a disadvantage that pump light is guided in the cladding elements. An improvement can be achieved by core-pumping. Therefore an optical fiber wherein said active material in the core region comprises Er and/or Yb in sufficient amounts to provide amplification of light in the core and suitable for pumping in the core is advantageous.

In an embodiment, the optical fiber is adapted to guide light due to the PBG effect in the range from 900 to 990 nm, such as around 920 and/or 980 nm. This is e.g. of interest for a core pumped optical fiber comprising ErYb or Yb as active material in the core.

In an embodiment, the optical fiber is adapted to have a stop band in a range from approximately 1000 nm to approximately 1200 nm. This is e.g. of interest for a core pumped optical fiber comprising ErYb or Yb as active material in the core.

In an embodiment, the optical fiber is adapted to guide light between 1500 nm and 1600 nm. This is e.g. of interest for an optical fiber comprising ErYb as active material in the core.

In an embodiment, the optical fiber is adapted to guide light between 1100 nm and 1300 nm, such as between 1150 nm and 1250 nm, such as between 1200 nm and 1300 nm, such as between 1200 nm and 1250 nm. This is e.g. of interest for a cladding pumped optical fiber comprising Yb as active material in the core.

In an embodiment, the cladding region is adapted for propagating light at said pump wavelength $\lambda_p$.

In an embodiment, $\lambda_s$ and $\lambda_p$ are located on each side of the wavelength range constituting a stop band. In an embodiment, $\lambda_s$ and $\lambda_p$ are located on the same side of the wavelength range constituting a stop band.

In an embodiment, at least some of said micro-structural elements are made of an MSE-material and comprises optically active material.

In an embodiment, amplified spontaneous emission and lasing within the wavelength range of a stop band is reduced to less than 25% of the unreduced value, such as less than 10%, such as less than 5%, such as less than 1% of the unreduced value.

In an embodiment, the signal wavelength $\lambda_s$ is located relative to the stop band so that transmission at any wavelength in the stop band is at least 10 dB/m less than at $\lambda_s$, such as at least 15 dB/m, such as at least 20 dB/m, such as at least 25 dB/m less, such as at least 30 dB/m less than at $\lambda_s$.

In an embodiment, the wavelength $\lambda_{ASE}$ is substantially equal to the wavelength of maximum emission cross section $\sigma_E$ in the stop band.

In an embodiment, the wavelengths $\lambda_{stop1}$ and $\lambda_{stop2}$ are defined relative to their adjacent ranges of transmission to have a transmission level that is at least 10 dB/m less than a peak level of the adjacent transmission range, such as at least 15 dB/m, such as at least 20 dB/m, such as at least 25 dB/m less than a peak level of the adjacent transmission range.

In an embodiment, the difference in emission cross-sections $\sigma_E$ at a signal wavelength $\lambda_s$ and at a wavelength $\lambda_{ASE}$ in a stop band fulfill the relation $\sigma_E(\lambda_s)<0.5\ \sigma_E(\lambda_{ASE})$, such as $\sigma_E(\lambda_s)<0.2\ \sigma_E(\lambda_{ASE})$, such as $\sigma_E(\lambda_s)<0.1\ \sigma_E(\lambda_{ASE})$, where $\sigma_E(\lambda_{ASE})$ is a maximum emission cross-section in the stop band.

In an embodiment, $\lambda_s$ is in the range from 970 nm to 1030 nm, such as around 980 nm. In an embodiment, $\lambda_s$ is in the range from 1070 nm to 1300 nm, such as in the range from 1100 nm to 1200 nm. In an embodiment, $\lambda_s$ is in the range from 1450 nm to 1700 nm, such as in the range from 1500 nm to 1600 nm, such as around 1535 nm or 1550 nm.

In an embodiment, a higher wavelength $\lambda_{stop2}$ of a stop band is in the range from 1000 nm to 1170 nm, such as from 1030 nm to 1079 nm, or such as from 1000 to 1120 nm, whereby e.g. a laser or amplifier operating around 1178 nm or around 1120 nm or around 1140 nm, respectively, can be provided.

In an embodiment, an upper wavelength $\lambda_{stop2}$ of a stop band is in the range from 1031 nm to 1080 nm and larger than $\lambda_{stop1}$.

In an embodiment, the core region material is silica.

In an embodiment, the active material in the core region comprises Yb. In an embodiment, the active material in the core region comprises ErYb.

In a preferred embodiment, the cladding region comprises solid, relatively high-index micro-structural elements embedded in a relatively low-index cladding background material.

In an embodiment, the cladding region comprises micro-structural elements in the form of voids.

In an embodiment, the cladding region comprises micro-structural elements in the form of voids that comprise liquid crystal or other material. This has the advantage of providing tunable stop-bands, facilitating tunable amplification or lasing wavelength(s).

In an embodiment, the cladding region comprises at least one further element that has absorption at $\lambda_{ASE}$. In an embodiment, the core region comprises at least one further material that has absorption at $\lambda_{ASE}$. In an embodiment, the further element or material is Samarium.

In an embodiment, cladding background material is silica.

In an embodiment, the micro-structural elements embedded in the cladding background material have refractive indices above that of silica.

In an embodiment, the core region has a refractive index matched to that of the cladding background material, such as to that of silica.

In an embodiment, the core region has a refractive index above that of silica whereby reduced leakage losses can be provided.

In an embodiment, the core region has a refractive index that is smaller than that of the micro-structural elements of the cladding region. In an embodiment, the core region has a refractive index below that of silica.

In an embodiment, the optical fiber has substantially two-fold symmetry.

In an embodiment, the optical fiber exhibits polarization maintaining properties at $\lambda_s$. In an embodiment, the optical fiber exhibits polarizing properties at $\lambda_s$.

In an embodiment, the optical fiber exhibits positive dispersion at $\lambda_s$.

In an embodiment, the optical fiber further comprises an outer cladding region. In a preferred embodiment, the optical fiber is a double-clad fiber. In an embodiment, the optical fiber is an air-clad fiber. In an embodiment, the optical fiber is a polymer-based double-clad fiber. In an embodiment, the optical fiber is an F-doped double-clad fiber. F-doped double-clad fiber refers to the fiber having an F-doped outer cladding that provides confinement of pump light.

In an embodiment, the optical fiber comprises at least one tapered end.

In an embodiment, the optical fiber comprises at least one tapered section.

The present inventors have realized that reduced ASE or suppression of nonlinear effects is possible by tapering of one or more sections of optical fiber according to the various preferred embodiments of the present invention. The tapering facilitates adapting the filtering effect of the fibers to suppress amplification and/or lasing at undesired wavelengths.

In an embodiment, said micro-structural elements are arranged in the cladding region in a periodic pattern when viewed in a transversal cross section of the optical fiber, said periodicity being defined by the location in said transversal cross section of the centers of said micro-structural elements, said periodic pattern being an essentially two dimensional pattern, such as a rectangular pattern, such as a triangular pattern, such as a quadratic pattern, such as a hexagonal pattern.

In an embodiment, said micro-structural elements, when viewed in a transversal cross section of the optical fiber, have essentially identical form, such as essentially circular or essentially elliptical.

In an embodiment, said micro-structural elements have essentially identical maximum dimension $d_{mse}$ in a cross section perpendicular to a longitudinal axis of said optical fiber.

In an embodiment, the ratio of said maximum dimension $d_{mse}$ of said micro-structural elements to a minimum (center-to-center) distance $\Lambda$ between two neighboring micro-structural elements $d_{mse}/\Lambda$ is smaller than or equal to 0.8, smaller than or equal to 0.6, such as smaller than or equal to 0.35, such as smaller than or equal to 0.25, such as smaller than or equal to 0.15. In an embodiment, wherein the ratio of said maximum dimension $d_{mse}$ of said micro-structural elements to a minimum distance $\Lambda$ between two neighboring micro-structural elements $d_{mse}/\Lambda$ is in the range from 0.02 to 0.80, such as from 0.02 to 0.10, such as from 0.10 to 0.25, such as from 0.25 to 0.45, such as from 0.45 to 0.80.

In an embodiment, said micro-structural elements include elements of at least two different maximum dimensions $d_{mse,1}, d_{mse,2}$ in a cross section perpendicular to a longitudinal axis of said optical fiber.

In an embodiment, the optical fiber further comprises at least one stress-applying element. In an embodiment, said stress-applying element, having a coefficient of thermal expansion $\alpha_{T,SAP}$ and extending in said longitudinal direction of said optical fiber, is located in a cladding background material having a coefficient of thermal expansion $\alpha_{T,cladback}$ different from $\alpha_{T,SAP}$. In an embodiment, the coefficient of thermal expansion $\alpha_{T,SAP}$ of said stress-applying element is different from the coefficient of thermal expansion $\alpha_{T,MSE}$ of the micro-structural elements.

In an embodiment, the location of said at least one stress element relative to said core region and said micro-structural elements and said coefficients of thermal expansion $\alpha_{T,SAP}$ and $\alpha_{T,cladback}$ are adapted to provide a stress induced birefringence in said core region of said optical fiber.

In an embodiment, said cladding region comprises a number N of stress-applying elements where N>1, each stress-applying element having a maximum external dimension of $d_{SAP,i}$, i=1, 2, ..., N and wherein at least one stress-applying element has a maximum external dimension $d_{SAP,p}$ different from another stress-applying element having a maximum external dimension $d_{SAP,q}$. In an embodiment, said cladding region comprises a number N of stress-applying elements where N>1, each stress-applying element having a coefficient of thermal expansion $\alpha_{T,SAP,i}$, i=1, 2, ..., N and wherein at least one stress-applying element has a coefficient of thermal expansion $\alpha_{T,SAP,r}$ different from another stress-applying element having a coefficient of thermal expansion $\alpha_{T,SAP,s}$.

In an embodiment, said at least one stress-applying element is essentially circular in a cross section perpendicular to a longitudinal axis of said optical fiber. In an embodiment, said at least one stress-applying element has an essentially semi-circular or D-shaped form or has the form essentially of an angular segment of a ring when viewed in a cross section perpendicular to a longitudinal axis of said optical fiber.

In an embodiment, the optical fiber comprises at least two stress-applying elements, which, in a transversal cross section of the optical fiber, are positioned relative to each other in a two dimensional pattern, said pattern being defined by the location in said transversal cross section of the centers of said stress-applying elements, and said pattern showing an essentially n-fold rotational symmetry relative to a centre axis of said core region. In an embodiment, n is larger than or equal to 1, such as equal to 2, such as larger than 2p+1 where p is a positive integer larger than 0.

In an embodiment, said optical fiber is adapted to propagate light of a wavelength $\lambda$ comprised in the range from 0.15 µm to 11 µm, such as from 0.15 µm to 2.5 µm, such as from 0.4 µm to 1.7 µm.

In an embodiment, a maximum dimension of the core region $d_{core}$ is larger than said wavelength $\lambda$ propagated by said optical fiber, such as larger than 5 times $\lambda$, such as larger than 10 times $\lambda$, such as larger than 20 times $\lambda$, such as larger than 30 times $\lambda$.

In an embodiment, the birefringence of the core region $B_{mode}$ is larger than $5*10^{-5}$.

In an embodiment, a maximum dimension of the core region $d_{core}$ is in the range from 1 µm to 100 µm or larger.

In an embodiment, the optical fiber comprises two groups of stress-applying elements arranged mirror-symmetrically around a line through the centre of the core region when viewed in a transversal cross section of the optical fiber. In an embodiment, each group of stress-applying elements comprises at least one stress-applying element, such as at least two, such as at least three, such as at least four, such as at least five, such as at least six, such as at least eight stress-applying elements.

In an embodiment, said stress-applying element(s) is/are arranged adjacent to and as close as possible to the core region. In an embodiment, said stress-applying element(s) is/are arranged around the core region so that at least $N_{mse}$ micro-structural element is/are located between a stress-applying element and the core, where $N_{mse}$ is equal to 1, such as equal to 2, such as equal to 3, such as equal to 4, such as equal to 5. In an embodiment, said stress-applying element(s) is/are arranged around the core region so that at most $N_{mse}$ micro-structural element is/are located between a stress-applying element and the core, where $N_{mse}$ is equal to 1, such as equal to 2, such as equal to 3, such as equal to 4, such as equal to 5.

In an embodiment, said groups of stress-applying elements are arranged relative to each other so that two straight lines through the centre of said core region dividing a transversal cross section of the optical fiber in four fields and each line touching the outline of at least one stress-applying element of each group thereby enclose said two groups of stress-applying elements in opposite fields and define an enclosing centre angle y wherein y is smaller than or equal to 130°, such as smaller than or equal to 110°, such as smaller than or equal to 90°, such as smaller than or equal to 75°.

In an embodiment, said cladding region comprises an outer air cladding region surrounding said core region, said stress-applying element(s) and at least a part of said cladding region.

In an embodiment, said cladding background material and/or said core region and/or said at least one stress-applying element comprise(s) silica. In an embodiment, said at least one stress-applying element comprises borosilicate.

In an embodiment, said core region comprises refractive index modifying and/or photosensitive dopant material(s).

In an embodiment, said core region comprises rare earths dopant ions, such as Er, Yb, Nd, Ho, Sm or Tm or combinations thereof. In an embodiment, the optical fiber is adapted to exhibit photonic bandgaps at different wavelength ranges in different radial directions of a cross section of the optical fiber.

Preform

In an aspect of the invention, a preform for fabricating an optical fiber according to a preferred embodiment of the invention and as described above and in the accompanying claims is provided, the preform comprising stacked longitudinal preform elements, said preform elements comprising at least one preform core element, a number of preform cladding elements, optionally at least one preform stress-applying element, and optionally a preform overcladding tube, and wherein said preform core element, said preform cladding elements and said at least one preform stress-applying element are stacked and optionally placed in said preform overcladding tube.

In an embodiment, at least one of said at least one preform core element is a rod comprising a material having a refractive index $n_{core}$. In an embodiment, said preform cladding elements comprise capillary tubes and/or solid rods comprising a material having a refractive index $n_{cladback}$. In an embodiment, said preform cladding elements comprise solid rods comprising a material having a refractive index $n_{mse}$. In an embodiment, said at least one preform stress-applying element is a rod comprising a material having a refractive index $n_{SAP}$. In an embodiment, an outer dimension $D_{SAP}$ of said preform stress-applying element is larger than an outer dimension $D_{clad}$ of said preform cladding elements. In an embodiment, an outer dimension $D_{SAP}$ of said preform stress-applying element is substantially equal to an outer dimension $D_{clad}$ of said preform cladding elements.

In an embodiment, said preform cladding elements comprise a number of large hole capillary tubes arranged to form at least one outer ring surrounding said at least one preform core element, optionally said at least one preform stress-applying element and at least a part of said preform cladding elements, said arrangement of large hole capillary tubes being suitable for forming an outer air cladding in an optical fiber drawn from said preform.

In an embodiment, at least one of said preform elements comprises silica.

In an embodiment, the preform comprises preform cladding elements of different cross-sectional sizes. In an embodiment, the preform comprises preform cladding elements of different refractive indices. In an embodiment, the preform comprises solid preform cladding elements. In an embodiment, at least some of the solid preform cladding elements have a refractive index profile. In an embodiment, at least some of the solid preform cladding elements have an up-doped region surrounded by a region of lower refractive index when viewed in a cross-section of the element. In an embodiment, the preform comprises solid preform cladding elements having up-doped regions of different cross-sectional size. In an embodiment, preform cladding elements of identical cross sectional size and/or of identical cross-sectional size of up-doped regions and/or of identical refractive indices are arranged in different cross sectional regions of the optical fiber.

Article

In an aspect of the invention, an article comprising an optical fiber according to the invention and as described above and in the accompanying claims is provided. In an embodiment, the article comprises a source of signal light comprising a signal wavelength $\lambda_s$. In an embodiment, the signal light comprises a wavelength in the optical wavelength range, such as in the range from 150 nm to 11 μm, such as in the range from 1.0 to 1.1 μm. In an embodiment, the signal light comprises a wavelength above 1100 nm, such as above 1200 nm. In an embodiment, the signal light comprise a wavelengths between 1100 nm and 1300 nm, such as between 1150 nm and 1250 nm, such as between 1200 nm and 1300 nm, such as between 1200 nm and 1250 nm. In an embodiment, the signal light comprises a wavelength below 1000 nm. In an embodiment, the signal light comprises wavelengths around 920 and/or 980 nm. In an embodiment, the signal light comprises wavelengths between 1500 nm and 1600 nm. In an aspect of the invention, a fiber amplifier or laser comprising an optical fiber according to a preferred embodiment of the invention and as described above and in the accompanying claims is provided.

In an aspect of the invention, a fiber amplifier or laser for amplifying an optical signal at a signal wavelength $\lambda_s$ is provided, the fiber amplifier or laser comprising a length of a first optical fiber for pumping the fiber amplifier or laser and a length of a second optical fiber for amplifying the optical signal wherein the second optical fiber is an optical fiber according to a preferred embodiment of the invention and as described above and in the accompanying claims.

In an embodiment, the first optical fiber is an optical fiber as described above and in the accompanying claims. In an embodiment, the fiber amplifier or laser further comprises a length of a third optical fiber between said first and second optical fibers. In an embodiment, the fiber amplifier or laser operates at 1178 nm. In an embodiment, the optical fiber comprises Yb. In an embodiment, the fiber amplifier or laser comprises a source of signal light comprising a signal wavelength $\lambda_s$.

In preferred embodiments, the solid PBG fibers are incorporated into or used in high power amplifiers and/or lasers, where nonlinear effects, such as e.g. SBS (stimulated Brillouin scattering), SRS (stimulated Raman scattering), FWM (four wave mixing), are suppressed. For example, an active, solid core fiber according to a preferred embodiment of the invention is designed to have a transmission-band at a signal wavelength and stop-band at a wavelength that corresponds to the Raman shift.

Suppression of stimulated Raman scattering is important for increasing power in fiber lasers and amplifiers. The present inventors have realized a new way to suppress stimulated Raman scattering.

In a preferred embodiment of the present invention, an active, solid core PBG fibre exhibits a transmission band at an operational wavelength and a stop-band at a wavelength at the corresponding peak of the Raman gain spectrum. The peak is often referred to as the Stokes shift. Stimulated Raman scattering and the Stoke shift are known from literature, see e.g. textbook "Fiber-Optic Communication Systems", 2nd edition, by Govind P. Agrawal, John Wiley & Sons Inc., 1997, page 380-381.

Preferably, an operational wavelength is in the range from 950 nm to 1100 nm, such as for example around 980 nm or around 1060 nm is used. In other preferred embodiments the operational wavelength is around 1.5 μm, such as around 1535 nm or around 1550 nm.

In an aspect of the invention, an optical amplifier or laser is provided, the optical amplifier or laser comprising
 a) an optical pump source which operates at a wavelength, $\lambda_p$, and with an average power that exceeds 5 W,
 b) an active optical fiber as described above, in the detailed description and in the accompanying claims,
 c) a coupling device providing pump light from said optical pump source to said active optical fiber, and
 d) wavelength-selective means to ensure amplification or lasing at a signal wavelength, $\lambda_s$.

In a preferred embodiment, the wavelength selective means are selected from the group consisting of: a seed-laser, fiber Bragg gratings, external metal coated mirrors, and external dielectric mirrors and combinations thereof.

In a preferred embodiment, $\lambda_s$ is in the range from 0.75 μm to 0.85 μm, or in the range from 1.0 μm to 1.1 μm, or in the range from 1.5 to 1.6 μm.

In a preferred embodiment, $\lambda_s$ is separated spectrally from the range $\lambda_{stop1}$ to $\lambda_{stop2}$ by less than the Raman shift, such that SRS is suppressed.

In a preferred embodiment, $\lambda_s$ is separated spectrally from the range $\lambda_{stop1}$ to $\lambda_{stop2}$ by less than the Brillouin shift, such that SBS is suppressed.

In an aspect of the invention, an object of the invention is achieved by an optical delivery system, comprising
 a) an optical source which operates at a wavelength, $\lambda_s$, and with a power that exceeds 5 W,
 b) an optical delivery fiber defining a longitudinal direction, the optical fiber comprising
  1. a cladding region surrounding said core region, said cladding region comprising micro-structural elements extending in said longitudinal direction,
  2. said fiber being adapted to guide light by the photonic bandgap effect at $\lambda_s$ and to have one or more pass bands and at least one stop-band over a wavelength range from $\lambda_{stop1}$ to $\lambda_{stop2}$, wherein said stop-band suppress non-linear effects.

In a preferred embodiment, $\lambda_s$ is in the range from 0.75 μm to 0.85 μm, or in the range from 1.0 μm to 1.1 μm, or in the range from 1.5 to 1.6 μm.

In a preferred embodiment, $\lambda_s$ is separated spectrally from the range $\lambda_{stop1}$ to $\lambda_{stop2}$ by less than the Raman shift, such that SRS is suppressed.

In a preferred embodiment, $\lambda_s$ is separated spectrally from the range $\lambda_{stop1}$ to $\lambda_{stop2}$ by less than the Brillouin shift, such that SBS is suppressed.

Use

In an aspect of the invention, use of an optically active PBG-fiber is provided. The PBG-fiber comprises one or more (preferably neighbouring) stop- and pass-bands (e.g. at least one stop-band neighbouring a pass-band). The use is performed at a signal wavelength located in a pass-band of the PGB-fiber. The emission cross-section of the optically active material at the signal wavelength is lower than the emission cross-section at a wavelength in a stop-band (e.g. in a neighbouring stop-band; such as lower than the maximum emission cross-section at a wavelength in a stop-band, e.g. in a neighbouring stop-band). In an embodiment, the optically active PBG-fiber is used to reduce or suppress amplified spontaneous emission at undesired wavelengths (located in a stop-band), whereby more efficient amplification at desired wavelengths (located in a pass-band) is enabled. In an embodiment, the stop-band is located at lower wavelengths than the signal wavelength. In an embodiment, the stop-band is located at higher wavelengths than the signal wavelength. In an embodiment, the optically active material comprises Yb. In an embodiment, use is performed at signal wavelengths above 1100 nm, and in particular at wavelengths above 1200 nm. In an embodiment, use is performed at signal wavelengths below 1000 nm. In an embodiment, the optically active material comprises Er. In an embodiment, the optically active material comprises Er and Yb. In an embodiment, use is performed at signal wavelengths around 920 and/or 980 nm. In an embodiment, use is performed at signal wavelengths between 1500 nm and 1600 nm. In an embodiment, use is performed at signal wavelengths between 1100 nm and 1300 nm, such as between 1150 nm and 1250 nm, such as between 1200 nm and 1300 nm, such as between 1200 nm and 1250 nm.

In an aspect of the invention, use of an optical fiber according to a preferred embodiment of the invention and as described above and in the accompanying claims is provided.

In an embodiment, use of an optical fiber as a polarization maintaining fiber or as a polarization maintaining fiber amplifier or as a polarization maintaining fiber laser is provided.

In an embodiment, use of an optical fiber as a polarizing fiber or as a polarizing fiber amplifier or as a polarizing fiber laser is provided.

In an embodiment, use of an optical fiber for dispersion compensation is provided.

In an embodiment, use of an optical fiber at signal wavelengths in the optical range, such as in the range from 150 nm to 11 μm is provided. In an embodiment, use of an optical fiber is provided at signal wavelengths below 1000 nm, such as around 920 and/or 980 nm, or in the range from 950 nm to 1100 nm, such as for example around 980 nm or around 1060 nm, or at wavelengths above 1100 nm, such as between 1100 nm and 1300 nm, such as between 1150 nm and 1250 nm, such as above 1200 nm, such as between 1200 nm and 1300 nm, such as between 1200 nm and 1250 nm, such as between 1500 nm and 1600 nm, such as around 1.5 µm, such as around 1535 nm or around 1550 nm.

In an aspect of the invention, use of a fiber amplifier or laser as described above or in the claims for generating light at 589 nm via frequency doubling at 1178 nm is provided.

System

In an aspect of the invention, a system for amplifying optical pulses, the system comprising an optical fiber as described above or in the claims is provided.

In an embodiment, the system is further adapted for compressing optical pulses.

In an embodiment, the system comprises a fiber amplifier or laser as described above or in the claims for generating light at 589 nm via frequency doubling at 1178 nm.

In an embodiment, the system comprises a source of signal light comprising a signal wavelength $\lambda_s$.

Method of Manufacturing an Optical Fiber

In an aspect of the invention, a method of manufacturing an optical fiber according to a preferred embodiment of the invention and as described above and in the accompanying claims is provided, the method comprising the steps of a) providing a preform according to a preferred embodiment of the invention and as described above and in the accompanying claims comprising longitudinally extending preform elements, the preform having a fixed end and a drawing end;
b) optionally sealing at least one end of said preform;
c) heating and drawing said preform from said drawing end with a predetermined drawing speed in one or more steps, optionally varying said predetermined drawing speed and/or said heating;
d) optionally applying a controlled pressure to said fixed end of said preform and optionally varying said applied pressure to control cross sectional dimensions of the drawn optical fiber.

In an aspect of the invention, a method of manufacturing an optical fiber according to a preferred embodiment of the invention and as described above and in the accompanying claims is provided, the method comprising the steps of a1) Providing at least one doped preform element, optionally doped with a photosensitive material, such as Ge, suitable for constituting a preform cladding element;
a2) Optionally heating and drawing the preform cladding element to a preform cladding rod or a number of rods; optionally including a cut and stack step, where one or more intermediate preform cladding rods are cut in lengths that are subsequently stacked, and repeating the drawing step;
a3) Providing one or more preform core elements comprising an optically active material, such as an optically amplifying material, such as a rare-earth element, and optionally a photosensitive material, such as Ge;
a4) Optionally heating and drawing the preform core element(s) to a preform core rod or a number of rods; optionally including a cut and stack step, where one or more intermediate preform core rods are cut in lengths that are subsequently stacked, and repeating the drawing step;
a5) Stacking a number of preform cladding elements or rods and at least one active preform core element or rod;
a6) Optionally placing the stack inside an overcladding tube;
a7) Optionally, collapsing the overcladding tube around the stack, the stack having a fixed end and a drawing end;
a8) Optionally sealing at least one end of said stack;
a9) heating and drawing said preform from said drawing end with a predetermined drawing speed in one or more steps, optionally varying said predetermined drawing speed and/or said heating;
a10) Optionally applying a controlled pressure to said fixed end of said stack and optionally varying said applied pressure to control cross sectional dimensions of the drawn optical fiber.

In an embodiment, the methods further comprise the step of adapting the optical fiber to exhibit photonic bandgaps at different wavelength ranges in different radial directions of a cross section of the optical fiber. In an embodiment, the adaptation is provided by one or more of the following steps:

A. Providing that the pitch of the micro-structural elements is different in different radial directions of a cross section of the optical fiber;
B. Providing that the cross-sectional sizes of the micro-structural elements over the cross section of the fiber are different; and
C. Providing that the refractive indices of the micro-structural elements over the cross section of the fiber are different.

In a preferred embodiment, micro-structural elements of an optical fiber according to a preferred embodiment of the invention are solid. In a preferred embodiment, the core region of an optical fiber according to a preferred embodiment of the invention is solid.

Filtering Material Having Spectrally Varying Absorption

The present inventors have realized that amplified spontaneous emission at undesired wavelengths may be suppressed in an optical fiber comprising an actively doped core region for propagating and/or amplifying light at a signal wavelength and a surrounding cladding region, the cladding region comprising a filter material exhibiting a wavelength dependent optical absorption, which is relatively larger at undesired wavelengths than at the signal wavelength.

In an aspect, the invention comprises an optical fiber for amplification of light at a signal wavelength, $\lambda_s$, and for suppressing light at undesired wavelengths, the optical fiber defining a longitudinal direction, the optical fiber comprising
  a core region for propagating light at said signal wavelength in a longitudinal direction of said optical fiber, the core region comprising a core region material,
  a cladding region surrounding said core region, said cladding region comprising micro-structural elements embedded in a cladding background material and extending in said longitudinal direction, and
  said core region at least over a part of its longitudinal and cross sectional extent comprising active material that allows optical amplification at least at said signal wavelength, and
wherein at least part of the cladding elements comprise a material that exhibit absorption at undesired wavelengths such that amplified spontaneous emission is suppressed at these wavelengths.

In an embodiment, Sm (Samarium) is used for this purpose.

Sm can e.g. be used to suppress ASE and/or lasing around 1.0 µm in ErYb doped, solid core PBG fibers.

In an aspect of the invention, an optical fibre in the form of a solid core PBG-fiber as described above, in the detailed description and in the claims is provided wherein at least some of the cladding elements are doped with a material that absorb optical energy at undesired wavelengths.

In an embodiment, at least a part of the cladding elements comprise Sm and/or another absorbing material that absorb light at one or more undesired signal wavelengths.

In an embodiment, the core comprises Er and Yb and at least part of the cladding elements comprises Sm.

In an embodiment, the optical fiber is a solid core PBG fiber with an Yb doped core that provides amplification and/or lasing around 1100 nm or a longer wavelength and the amplified/laser light is frequency doubled, trippled or quadrupled to a shorter wavelength.

In an embodiment, a signal wavelength around 1178 nm is used in a frequency doubling system, thereby providing light at wavelengths around 589 nm ('yellow light').

Further objects of the invention are achieved by the embodiments defined in the dependent claims and in the detailed description of the invention.

It should be emphasized that the term "comprises/comprising" when used in this specification is taken to specify the presence of stated features, integers, steps or components but does not preclude the presence or addition of one or more other stated features, integers, steps, components or groups thereof.

Figure 1:
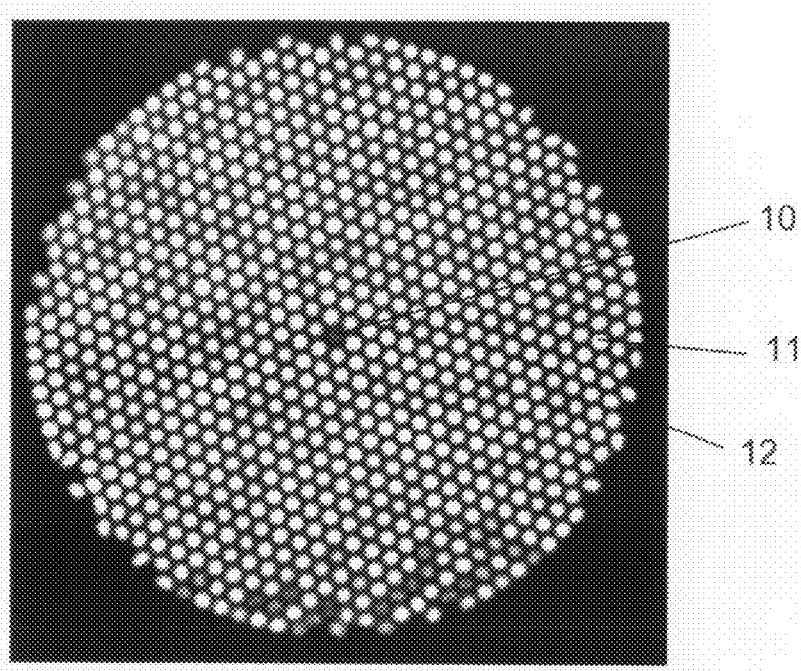
FIG. 1 shows a microscope picture of a solid PBG fiber as e.g. described in WO-02/101429.

The invention is defined by the features of the independent claim(s). Preferred embodiments are defined in the dependent claims. Any reference numerals in the claims are intended to be non-limiting for their scope.

MODE(S) FOR CARRYING OUT THE INVENTION

FIG. 1 shows a microscope picture of a solid PBG fiber as described in WO-02/101429 ('a solid PBG fiber' meaning a PBG fiber that does not rely on voids to achieve the PBG-effect). The PBG fiber comprises a solid core 10 surrounded by a cladding region comprising a substantially 2D periodic arrangement of high-index, solid elements 11 (light areas in picture) dispersed in a low-index cladding background material 12. The fiber of the present example has a pure silica core 10, Ge-doped rods 11 positioned in a triangular lattice in a pure silica background material 12 and around 15 periods surrounding the core region. The present invention also covers other means of forming pass and stop bands, e.g. including fibers having instead of a triangular arrangement, a rectangular (e.g. quadratic) or hexagonal (i.e. planar or 2D-periodic) or circular (e.g. radially periodic, including concentric regions of different (e.g. alternating) refractive indices) arrangement of high-index elements in the cladding (when viewed in a given cross section perpendicular to a longitudinal direction of the optical fiber).

The optical fiber exhibits waveguidance only for certain spectral ranges (transmission windows) and anti-guide outside transmission windows through the PBG effect. The core and/or cladding background material may comprise an optically active material, e.g. in the form of a rare-earth ion such as Er or Yb or Nd or Er—Yb. Other rare-earth ions or transition metal ions alone or in combination may be used, however.

Figure 2:
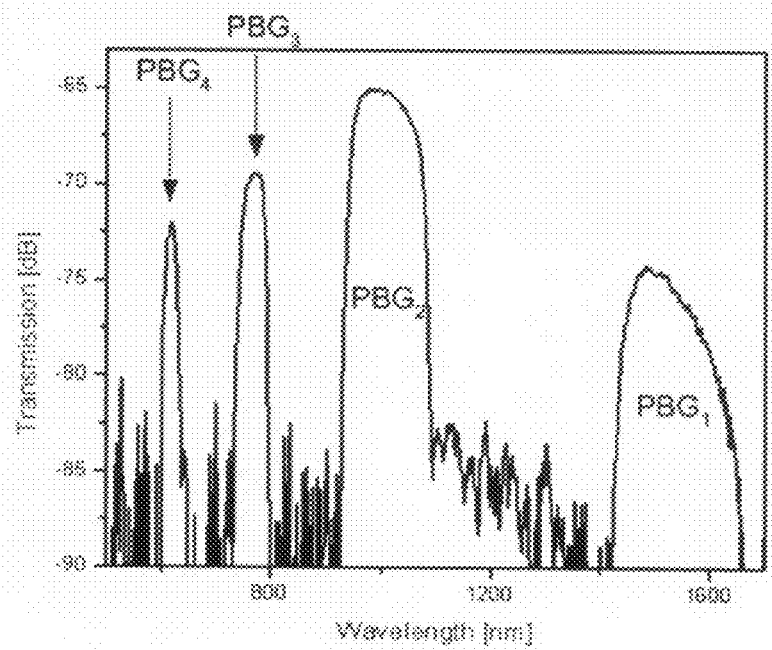
FIG. 2 shows a transmission spectrum of a solid PBG fiber.

FIG. 2 shows a transmission spectrum of a solid PBG fiber according to a preferred embodiment of the invention. Waveguidance in the core is only possible in certain spectral ranges (referred to as transmission windows or 'pass bands') through PBG effect. Outside these pass bands (indicated in FIG. 2 as $PBG_n$, n=1, 2, 3, 4), the fiber is anti-guiding for light in the core. An anti-guiding spectral range is referred to as 'stop band' in the present application. The spectral position and extent of the pass and stop bands can be designed by adapting design parameters of the fiber in a given cross section of the fiber (optionally invariant over the length or optionally varying over the length of the optical fiber), including the refractive index profile of the high-index elements, their form, size and separation, as well as the refractive index profile, size and shape of the core region. The detailed adaptation of fiber design parameters to achieve a desired spectral location of the pass and stop bands may for example be performed as described in WO-02/101429, [Argyros et al.] and [Bouwmans et al.]. WO-02/101429 e.g. describes photonic bandgap (PBG) fibers that may be fabricated without use of voids, e.g. by using relatively low-index-contrast structures, e.g. based on silica and silica doping techniques. Solid PBG-fibers have the advantage of avoiding the use of voids, including avoiding the use of a hollow core, whereby a fiber that is easier to manufacture and easier to splice to other fibers is provided.

The transmission spectrum of FIG. 2 exhibits several sharp higher order PBG regions ($PBG_1$-$PBG_4$) indicating a high cross-sectional uniformity and strong PBG effect. The fiber is robust to bending to diameters down to 10 cm.

Figure 3:
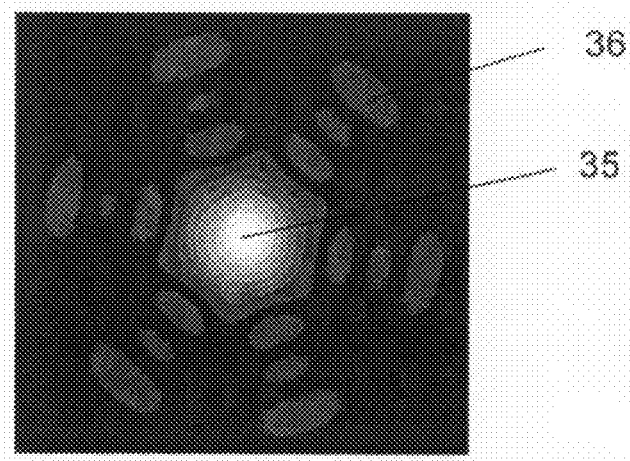
FIG. 3 shows a typical near-field image of a solid PBG fiber.

FIG. 3 shows a typical near-field image of a solid, PBG fiber according to a preferred embodiment of the invention. The image resembles that of a single mode standard fiber, thus providing a basis for good splicing conditions. The central (light) part of the image represents a core region 35, whereas the radially distributed (grey) areas 36 represent low intensity parts of the near field distributions that extend slightly into the cladding. The fiber has a mode field diameter (MFD) of 6.5 μm, a pitch of 6.1 μm ('pitch' being used as the center-to-center distance between micro-structural elements or features, e.g. in the cladding) and exhibits PBG guidance around 1060 nm.

The present inventors have realized that by providing solid PBG fibers with active core and/or cladding material and by adapting design parameters (including those mentioned above), it is possible to realize an efficient gain fiber for amplifiers and lasers at wavelengths $\lambda_s$ that are not—or less—accessible for conventional fibers (standard (non-microstructured fibers) as well as many micro-structured fibers).

This is achieved by arranging the fiber to have a core region comprising a core region material, surrounded by a cladding region comprising solid or liquid micro-structural elements embedded in a cladding background material and extending in a longitudinal direction of the optical fiber, and arranging that the core and/or cladding region—at least over a part of its/their spatial extension (radially as well as longitudinally)—comprise(s) active material that allows for optical amplification, and that the fiber is adapted to guide light by the photonic bandgap effect and to have at least one stop-band over a wavelength range (e.g. from $\lambda_{stop1}$ to $\lambda_{stop2}$), wherein $\lambda_s$ is located outside the stop-band and arranging that the active material—when located in the core region material and/or in the cladding background material (and/or in the material constituting the micro-structural elements)—has an emission spectrum with a higher value of the emission cross section $\sigma_E$ at a wavelength $\lambda_{ASE}$ in the stop-band than at $\lambda_s$ such that amplified spontaneous emission and lasing in the stop-band is reduced, preferably suppressed or eliminated.

Figure 4:
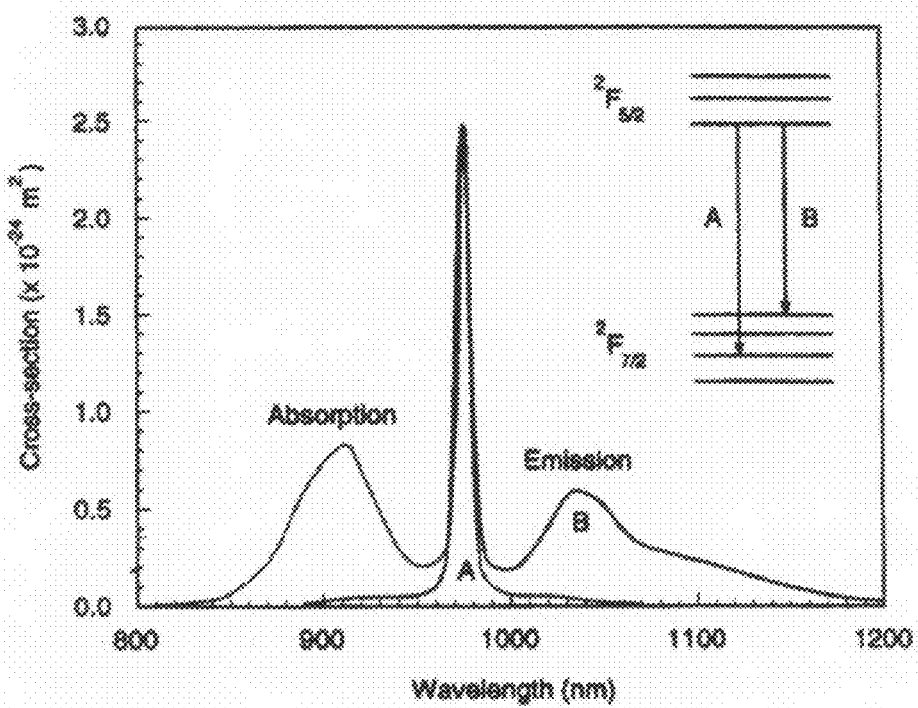
FIG. 4 shows the ground-state absorption spectrum, emission spectrum, and energy level diagram of $Yb^{3+}$ ions incorporated in silica (Yb doped silica) as a function of wavelength (from [Digonnet], FIG. 10, p. 145).
Figure 10:
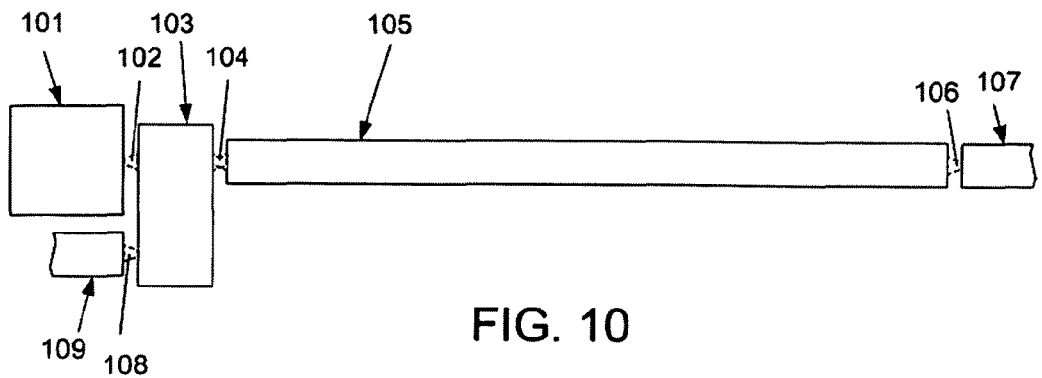
FIG. 10 shows a schematic illustration of fiber amplifier comprising a fiber according to a preferred embodiment of the present invention.

FIG. 4 shows the ground-state absorption spectrum, emission spectrum, and energy level diagram of $Yb^{3+}$ ions (for the $^2F_{5/2}$-$>^2F_{7/2}$ transition) incorporated in silica (Yb doped silica) as a function of wavelength (from [Digonnet], FIG. 10, p. 145).

Figure 5A:
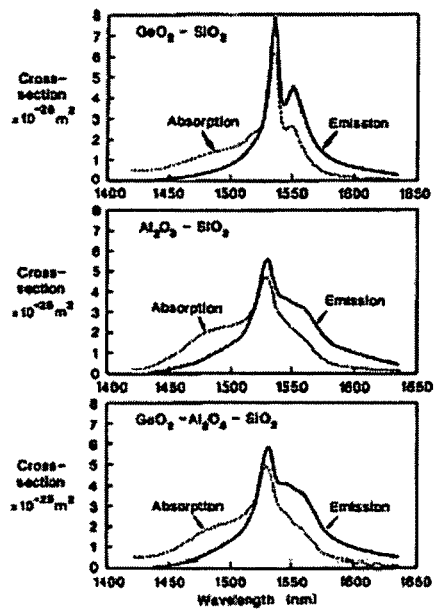
FIG. 5 shows absorption and emission cross sections of $Er^{3+}$ in various silica glasses as derived by two different methods, FIGS. 5a and 5b, respectively (from Barnes et al., IEEE J. of Quantum Electronics, Vol. 27, No. 4, 1991, pp. 1004-1010, FIGS. 1 and 6, respectively).
Figure 5B:
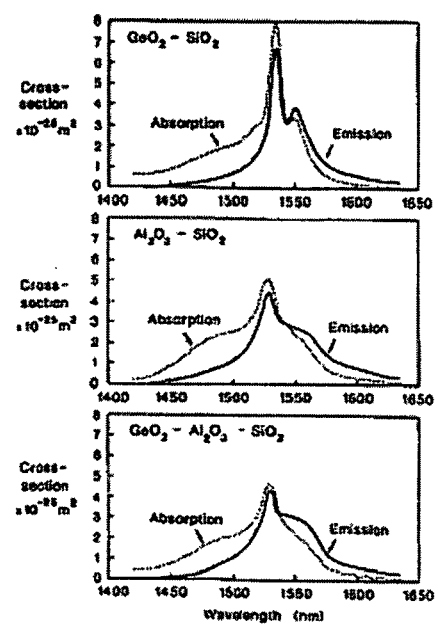
Figure 6:
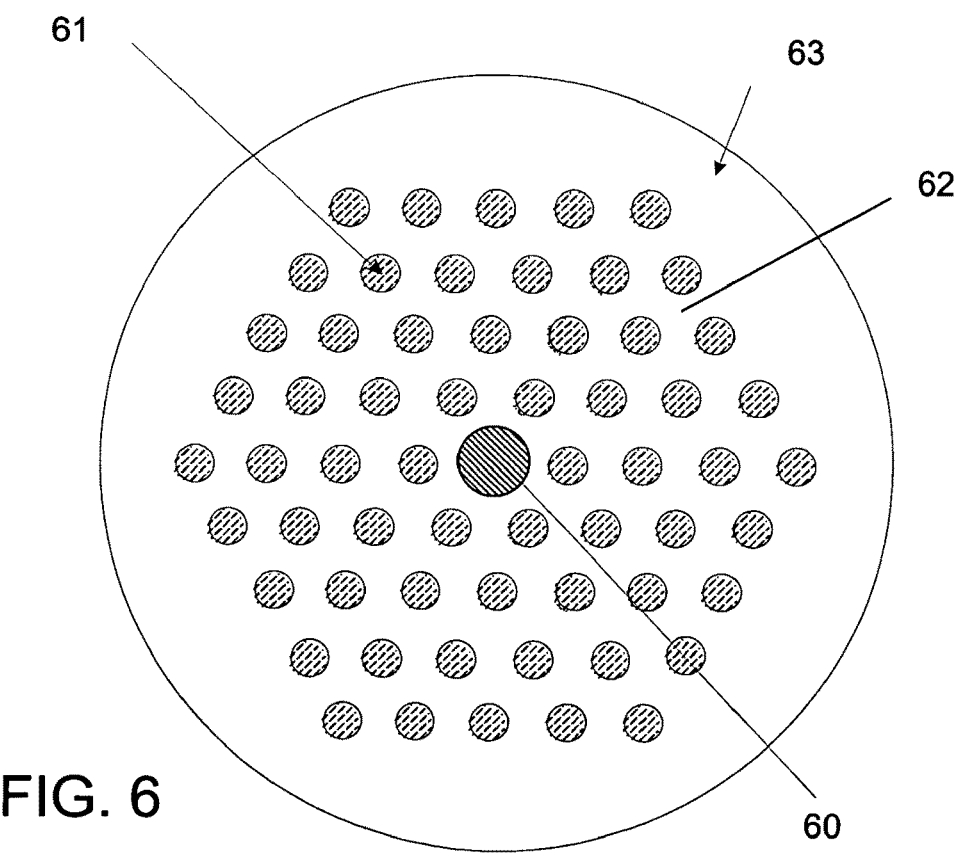
FIG. 6 schematically shows an optical fiber according to a preferred embodiment of the present invention.

FIG. 5 shows absorption and emission cross sections of wavelengths between 1400 and 1650 nm in units of $10^{-25}$ $m^2$ of $Er^{3+}$ for the $^4I_{13/2}$-$>^4I_{15/2}$ transition in various silica glasses as derived by two different methods, FIGS. 5a and 5b, respectively (from Barnes et al., IEEE J. of Quantum Electronics, Vol. 27, No. 4, 1991, pp. 1004-10109, FIGS. 1 and 6, respectively). FIG. 5a shows absorption and emission cross sections of $Er^{3+}$ based on experimental values of fluorescence and absorption bandwidths (Fuchtbauer-Ladenberg equations) for three different silica glass fibers containing Ge (top), Al (middle) and Ge, Al (bottom), respectively. FIG. 5b shows absorption and emission cross sections of $Er^{3+}$ based on (fluorescent) saturation power measurements for three different silica glass fibers containing Ge (top), Al (middle) and Ge, Al (bottom), respectively. There is a difference in the ratios of emission to absorption cross sections for Er located in the three glass hosts at a given wavelength for the two methods. However, outside a range around the maximum peak values of the emission and absorption cross-sections (i.e. outside a range from approximately 1520 nm to 1550 nm), the sign of the difference between the absorption and emission cross sections at a given wavelength (e.g. a signal wavelength $\lambda_s$) is not ambiguous when comparing the two measurement methods (which is of significance for an optical fiber or a system according to a preferred embodiment of the invention where pump light is propagated (or adapted to be propagated) in the same region of the waveguide as the lasing light (e.g. core pumping)). Likewise, the sign of the difference between the size of the emission cross sections at a wavelength $\lambda_{ASE}$ inside a stop band and at a signal wavelength $\lambda_s$ outside a stop band is unambiguously determined when the stop band includes the range around the maximum peak values of the emission and absorption cross-sections. Other methods for determining the absorption and emission cross sections may be used, cf. the discussion in [Digonnet], chapter 2.1.4. When deciding on the desirable location of a stop-band of a given optical fiber according to a preferred embodiment of the invention relative to characteristics of the relevant emission and/or absorption spectrum, the emission and/or absorption cross sections of the ion(s) in question (e.g. Er, or Er—Yb) located in the relevant host matrix (e.g. silica) should preferably have their origin from a spectrum obtained by one of the available appropriate methods of determining the cross sections (i.e. e.g. NOT taken from spectra obtained by different methods).

FIG. 6 schematically shows an optical fiber according to a preferred embodiment of the present invention. The fiber comprises a core 60 doped with an optically active material (suitable for optical amplification) surrounded by an inner cladding region wherein substantially periodically distributed solid, micro-structure elements 61 are arranged in an inner cladding background material 62. The inner cladding region surrounded by an outer cladding region 63 (e.g. representing an overcladding or one or more other cladding regions) that may or may not be of the same material as the inner cladding background material 62. The inner cladding comprises e.g. Ge-doped micro-structure elements. The core 60 comprises e.g. Yb doped silica. In an embodiment, the cladding background material 62 is un-doped silica.

Figure 7:
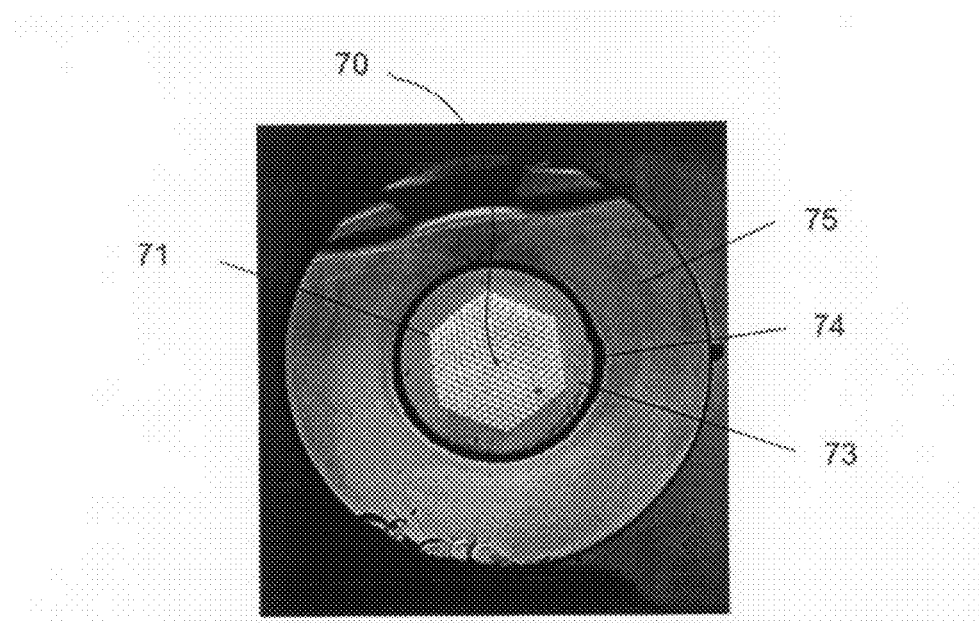
FIG. 7 shows an optical microscope picture of an Yb-doped fiber according to a preferred embodiment of the present invention.

FIG. 7 shows an optical microscope picture of an Yb-doped fiber according to a preferred embodiment of the present invention. The fiber cross-section of FIG. 7 shows a centrally located core region 70 surrounded by a first inner cladding region comprising a 2D-periodic arrangement of micro-structural elements 71 (here solid elements) embedded in an inner cladding background material. Around the micro-structural elements a further inner (solid) cladding region 73 (here also comprising inner cladding background material) is arranged. A first outer cladding comprising a ring of closely spaced, relatively larger voids (large compared to the size of the micro-structural elements of the inner cladding region) constituting an air-clad 74 is arranged. Here a single layer of holes is shown. Alternatively, several (e.g. 2, 3 or more) layers could be used. A second outer cladding region, here an overcladding 75, is shown around the first outer cladding region.

Figure 8:
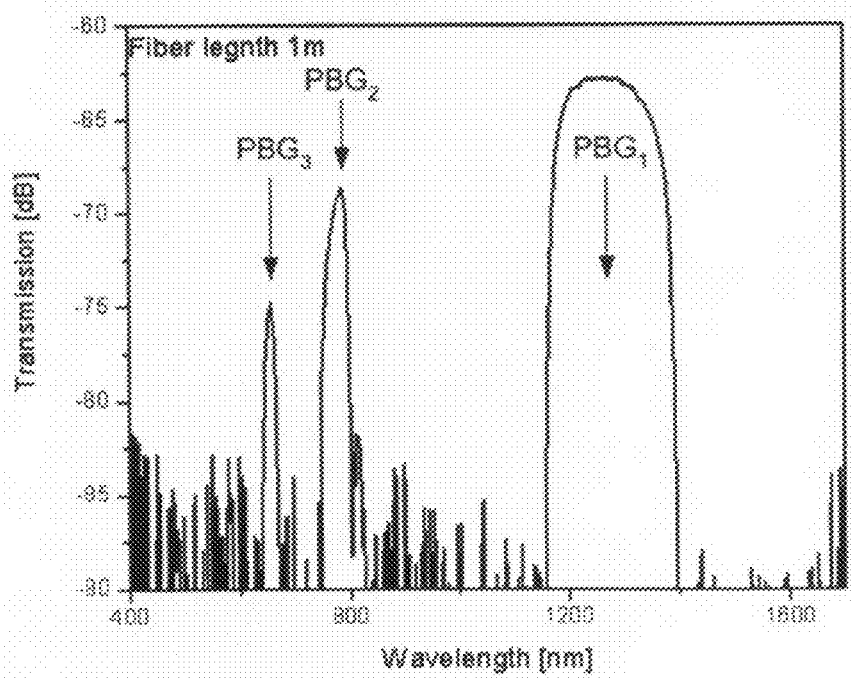
FIG. 8 shows a transmission spectrum of an active fiber according to a preferred embodiment of the present invention.

FIG. 8 shows a transmission spectrum of an active fiber according to a preferred embodiment of the present invention. The fiber has an Yb doped core and a cladding region with microstructure elements that are adapted to inhibit propagation of light in the core for wavelengths of approximately 850 nm to 1150 nm ('stop band' or 'anti-guiding range') and to allow propagation of light in the core for wavelengths of around 1150 nm and up to at least 1300 nm ('pass band' or 'photonic bandgap').

FIG. 9 shows schematic illustrations of fiber lasers comprising fibers according to preferred embodiments of the present invention. FIG. 9a shows an example of a fiber laser comprising a pump laser 91 (e.g. a semiconductor laser or a fiber laser) optically coupled 92 to a length of passive optical pump waveguide (e.g. a planar waveguide or a fiber, e.g. a double clad fiber), here shown as an air clad fiber 93 comprising a single mode core 930 surrounded by a multimode inner cladding 932 acting as a second core for propagating pump light surrounded by an outer cladding in the form of an air clad 935. The passive optical pump fiber 93 is optically coupled 94 to an amplifying optical fiber 95 according to an embodiment of the invention, e.g. as indicated in FIGS. 9c or 9d. An output waveguide 97 (here shown as a single mode, non-micro-structured standard fiber comprising at least a core 970 and a cladding 972) for receiving the light from the amplifying fiber 95 is optically coupled 96 to the amplifying fiber 95. The output waveguide 97 may be any optical waveguide appropriately coupled to the amplifying waveguide (including a planar waveguide or a micro-structured optical fiber). In the embodiment of FIG. 9a, spatially separated reflective elements, here in the form of fiber Bragg gratings 957, are located in the optical fiber 95, e.g. in a core region. Alternatively, the fiber Bragg gratings may be located in the core AND the cladding or solely in the cladding region. In an embodiment, only one distributed fiber Bragg grating with a centrally positioned phase shift is present in the optical fiber 95, thereby implementing a DFB-laser. In the alternative embodiment of FIG. 9b, reflective elements, here in the form of fiber Bragg gratings 937, 977 are located in the core region of the pump fiber 93 and the output fiber 97, respectively. Another difference to the embodiment of FIG. 9a is that the output fiber 97 is aligned and butt coupled (here also spliced 98) to the amplifying fiber 95. The writing of Bragg gratings in optical fibers are e.g. described in WO-98/36300. Instead of Bragg gratings, any other appropriate reflective elements may be used, e.g. reflectively coated end facets.

Figure 9A:
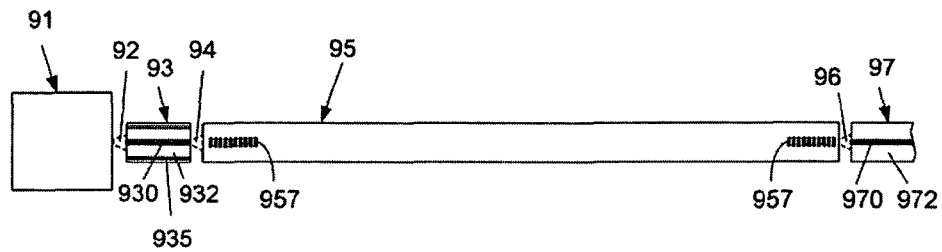
FIG. 9 shows a schematic illustration of fiber laser comprising a fiber according to a preferred embodiment of the present invention, FIG. 9a and FIG. 9b illustrating embodiments with reflecting elements located in the active fiber and separate from the active fiber, respectively and FIGS. 9c and 9d schematically illustrating two preferred embodiments of the amplifying fiber.
Figure 9B:
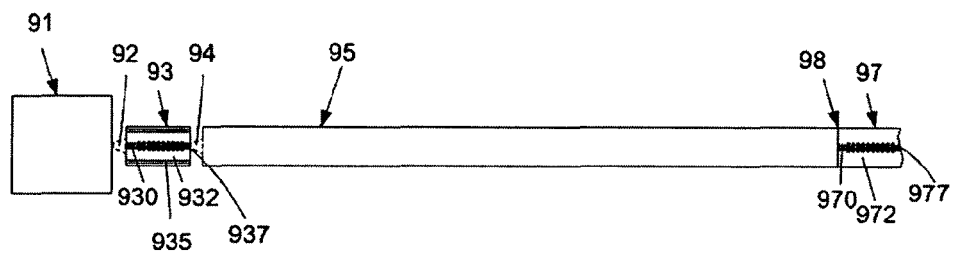
Figure 9C:
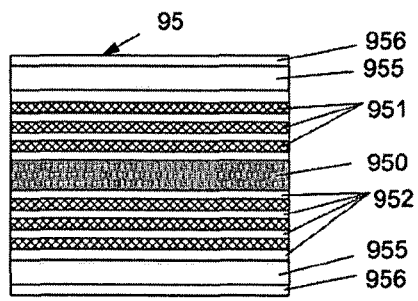
Figure 9D:
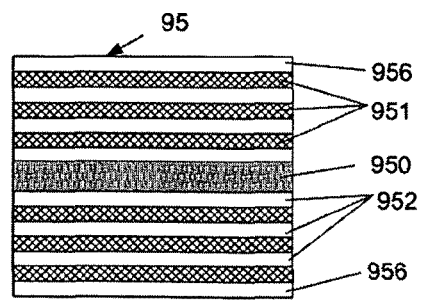

FIGS. 9c and 9d schematically shows two examples of the amplifying fiber 95 of the embodiments of FIGS. 9a and 9b. The optical fiber 95 of FIG. 9c is a PBG fiber comprising a solid core 950, an inner cladding region comprising solid micro-structural elements 951 embedded in an inner cladding background material 952 surrounded by an outer cladding region in the form of an air clad 955. The air clad is surrounded by a further cladding region 956 in the form of an overcladding. The optical fiber 95 of FIG. 9d is a PBG fiber comprising a solid core 950, an inner cladding region comprising solid micro-structural elements 951 embedded in an inner cladding background material 952. The inner cladding is surrounded by a further cladding region 956 in the form of an overcladding. The radial dimensions of the features of the fibers of FIGS. 9c and 9d including the number of radially disposed micro-structural elements are not to scale. An example of a design of a suitable optical fiber as schematically indicated in FIG. 9c (which is suitable for pumping in the inner cladding and lasing in the core) is illustrated in FIG. 7. An example of a design of a suitable optical fiber as schematically indicated in FIG. 9d (which is suitable for pumping and lasing in the core) is illustrated in FIGS. 1 (and 6).

The optical couplings 92, 94, 96 of FIGS. 9a and 9b may be of any convenient nature, e.g. be based on a free space coupling, a butt coupling (e.g. via an optical connector), a splice (between fibers, illustrated by reference numeral 98 in FIG. 9b) or a coupling via one or more optical components, or possibly combinations thereof.

FIG. 10 is a schematic illustration of fiber amplifier comprising a fiber according to a preferred embodiment of the present invention. The fiber amplifier comprises a pump light source 101 for emitting pump light (including a pump wavelength $\lambda_p$), optically coupled 102 to a coupler 103 (e.g. a wavelength selective coupler (WSC)). Pump light is introduced into a length of an amplifying fiber 105 according to a preferred embodiment of the invention, here shown as an optical coupling 104 to an end of the amplifying fiber. Input signal light (including a signal wavelength $\lambda_s$ different from $\lambda_p$) is introduced into the amplifying fiber 105 from an input signal source 107, e.g. including an optical fiber, optically coupled 106 to the amplifying fiber 105, here shown as an optical coupling 106 to an end of the amplifying fiber. The pump light excites the active material in the amplifying fiber and provides gain to the input signal light, thereby crating an amplified output signal which is output to an output medium 109, e.g. a length of an optical waveguide, via the coupler 103 optically coupled to the amplifying fiber 105 and the output medium 109 via respective optical couplings 104 and 108. Examples of relevant amplifying fibers 105 for the fiber amplifier are as indicated in FIG. 9 for the fiber laser (i.e. as indicated in FIGS. 9c and 9d). The optical couplings 102, 104, 106 and 108 of FIG. 10 may be of the same nature as indicated for the optical couplings of FIG. 9. The optical coupling 104 between coupler 103 and amplifying fiber 105 is in the present embodiment of the amplifier a two way optical coupling.

Figure 11:
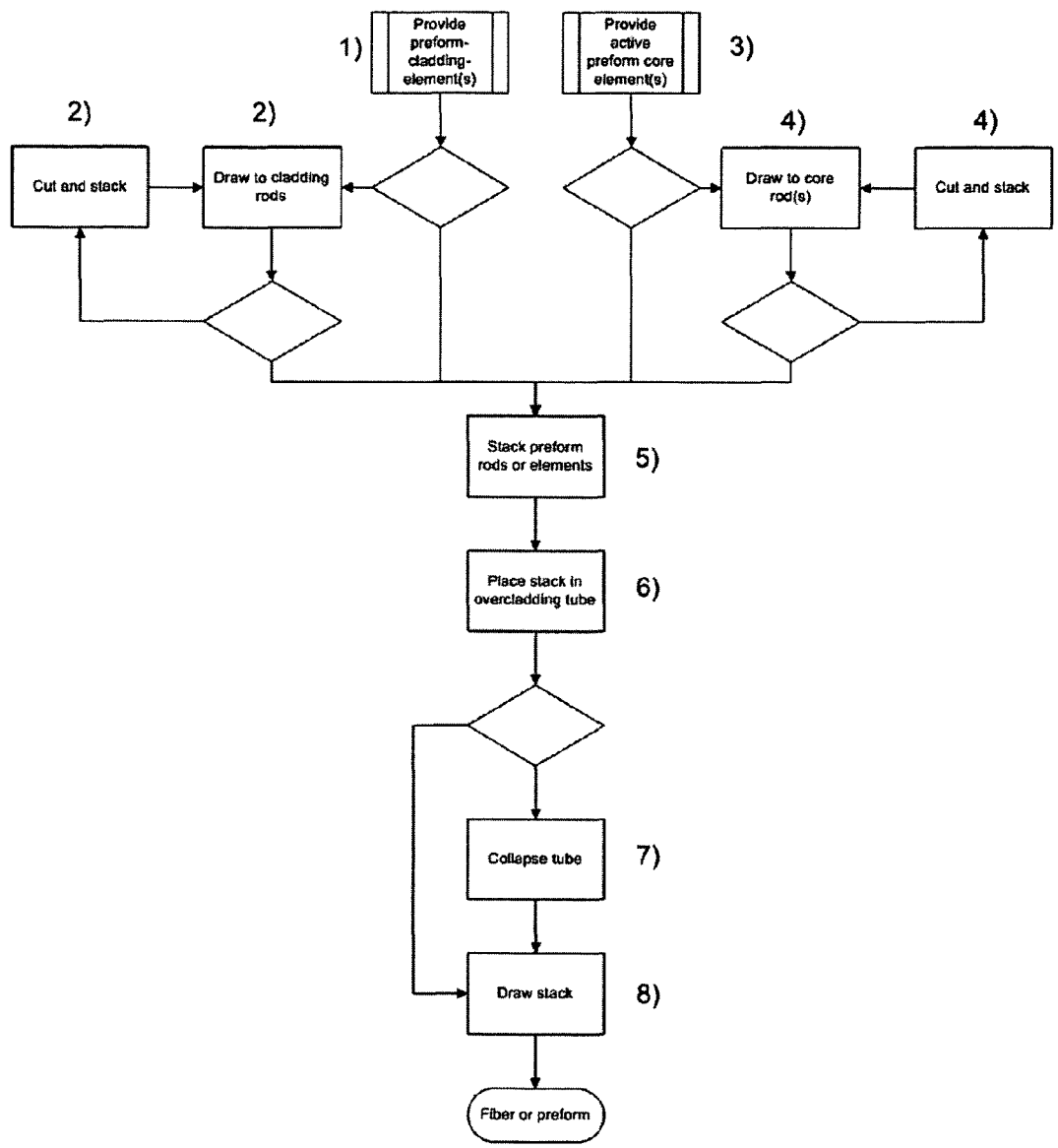
FIG. 11 schematically shows a method according to a preferred embodiment of the present invention for producing an active, solid PBG fiber.

FIG. 11 schematically shows a method according to a preferred embodiment of the present invention for producing an active, solid PBG fiber. The method comprises the steps of (corresponding step numbers 1)-8) are indicated in FIG. 11):
1) Providing at least one doped preform element (e.g. Ge-doped), for example a preform for a multi-mode optical fiber, suitable for use as a preform cladding element (and suitable for constituting a micro-structural element in the drawn fiber). A desired refractive index profile can be obtained from various suppliers including Heraeus Tenevo GmbH, Quarzstraβe 8, 63450 Hanau, Germany. Optionally providing one or more (un-doped or doped) preform cladding elements (suitable for constituting a cladding background material around micro-structural elements in the drawn fiber).
2) Optionally heating and drawing the preform cladding element(s) to a preform cladding rod or a number of rods (e.g. of 1 mm diameter); optionally including a cut and stack step (where one or more intermediate preform cladding rods are cut in lengths that are subsequently stacked) and repeating the drawing step.
3) Providing one or more active preform core elements. The preform core element(s) may e.g. be manufactured with a desired index profile by for example Modified Chemical Vapor Deposition (MCVD) processes, by Direct Nanoparticle Deposition (DND) processes, etc. (such as e.g. supplied by the company Liekki Corporation, Sorronrinne 9, FI-08500 Lohja, Finland), or by a multi-step processing method such as e.g. described in WO-02/088802.
4) Optionally heating and drawing the preform core element(s) to a preform core rod or a number of rods (e.g. of 1 mm diameter); optionally including a cut and stack step (where one or more intermediate preform core rods are cut in lengths that are subsequently stacked) and repeating the drawing step.
5) Stacking a number of preform cladding elements or rods and at least one active preform core element or rod.
6) Placing the stack inside an overcladding tube.
7) Optionally, collapsing the overcladding tube around the stack (e.g. using a lathe).
8) Heating and drawing the stack directly to fiber or to an intermediate preform that may subsequently be drawn to fiber.

The actual design of the optical fiber and thus the materials used and the arrangement of the corresponding preform elements or rods to provide optical fibers having bandgaps at predefined wavelengths are e.g. dealt with in WO-02/101429.

Figure 12A:
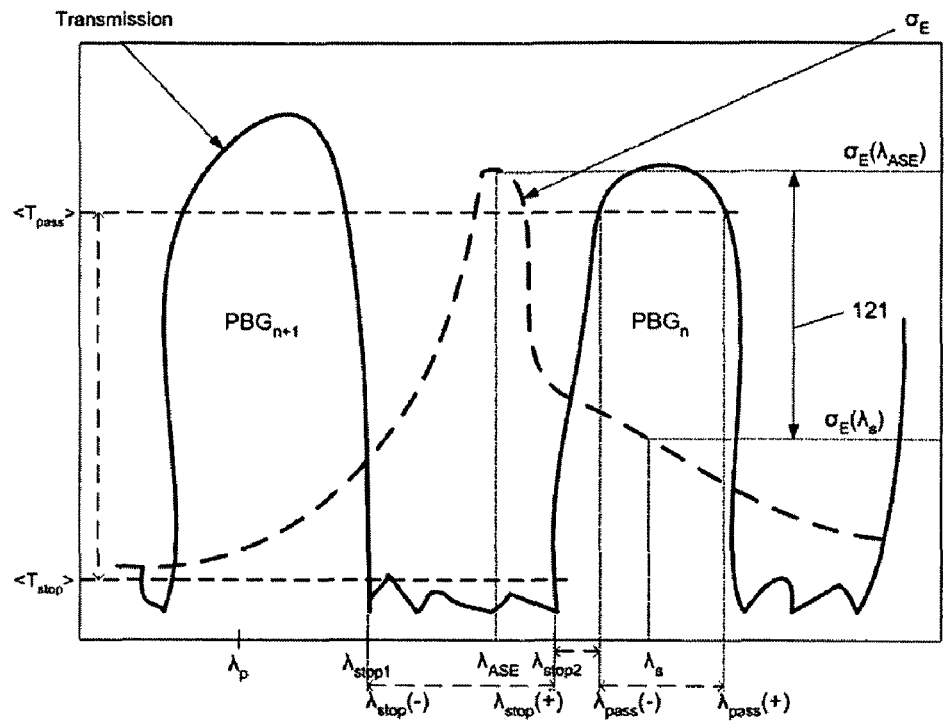
FIG. 12 shows examples of idealized transmission spectra and absorption/emission cross section spectra for optical fibers according to preferred embodiments of the invention, FIGS. 12a and 12b illustrating examples relevant for separate pumping and lasing waveguides (e.g. in the form of a double clad fiber) and FIG. 12c illustrating an example relevant for pumping and lasing in the same (region of a) waveguide (e.g. a core pumped fiber).
Figure 12B:
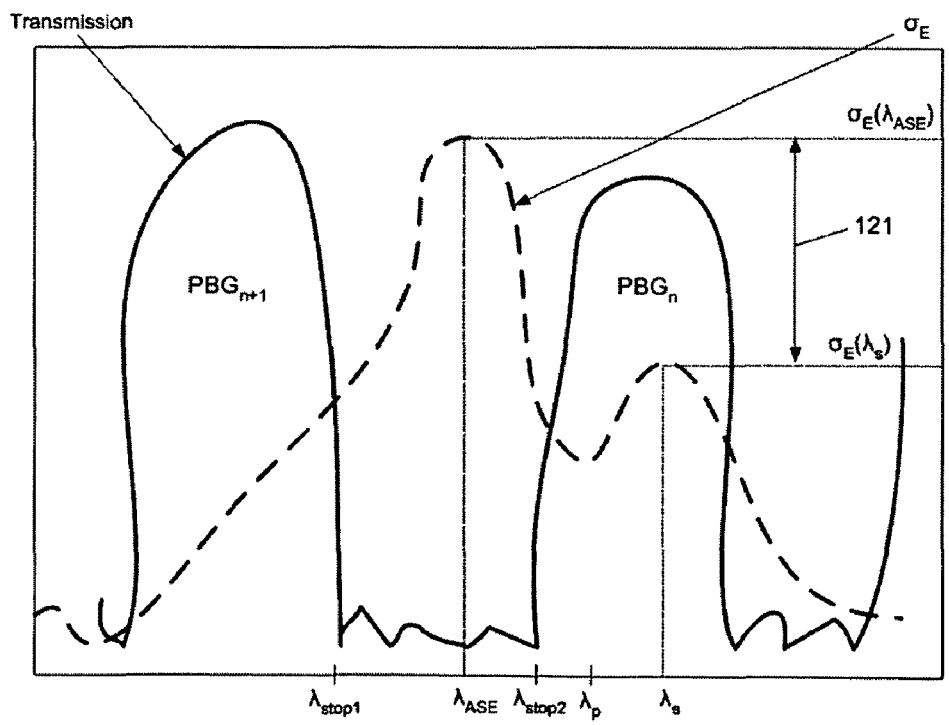
Figure 12C:
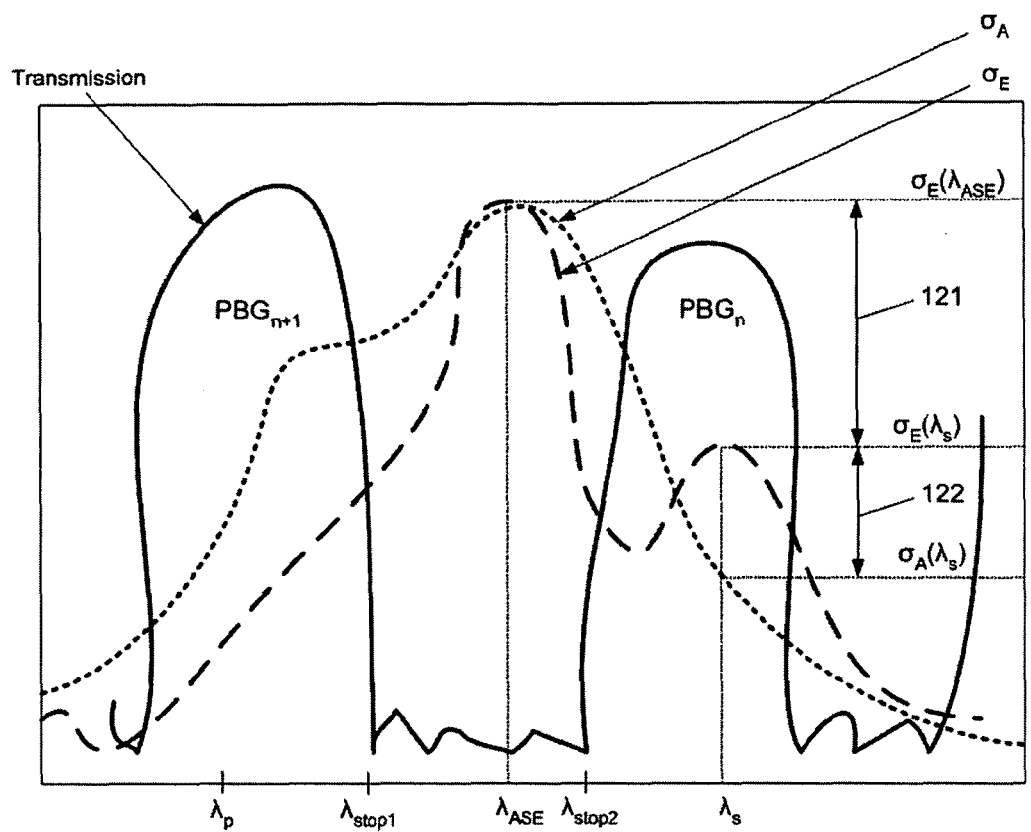

FIG. 12 shows three examples of idealized transmission spectra and emission cross section spectra for an optical fiber according to a preferred embodiment of the invention. FIGS. 12a and 12b illustrate examples relevant for separate pumping and lasing (e.g. using a double clad fiber as the optically active fiber, where pump light e.g. is propagated in the inner cladding and signal light (to be amplified) is propagated in the core of the fiber) and FIG. 12c illustrates an example relevant for pumping and lasing in the same (region of a) waveguide (e.g. a core pumped fiber).

In FIG. 12, the solid curves denoted 'transmission' represent the transmission spectrum for an optical fiber according to a preferred embodiment of the invention for a relevant part of the wavelength range, indicating two photonic bandgaps ('pass bands'), denoted $PBG_{n+1}$ and $PBG_n$, where light is guided in the core region due to the photonic bandgap effect. Between the two photonic bandgaps $PBG_{n+1}$ and $PBG_n$, a stop band (or 'anti-guiding range') is indicated between wavelengths $\lambda_{stop1}$ and $\lambda_{stop2}$. The dashed curves denoted '$\sigma_E$' represent the emission cross section $\sigma_E$ for the given active material in the given glass host. Values $\sigma_E(\lambda_s)$ and $\sigma_E(\lambda_{ASE})$ of the emission cross section $\sigma_E$ for, respectively, a signal wavelength $\lambda_s$ in a pass band and a wavelength $\lambda_{ASE}$ in the stop band (here taken to be the wavelength of the peak value of the emission cross section in the stop band considered) are indicated. The difference $\sigma_E(\lambda_s)-\sigma_E(\lambda_{ASE})$ is indicated by reference numeral 121. In FIG. 12c, the dotted curve denoted '$\sigma_A$' represents the absorption cross section $\sigma_A$ for the given active material in the given glass host (corresponding to those of the $\sigma_E$-curve). A value $\sigma_A(\lambda_s)$ of the absorption cross section $\sigma_A$ for the signal wavelength $\lambda_s$ is indicated. The difference $\sigma_E(\lambda_s)-\sigma_A(\lambda_s)$ is indicated by reference numeral 122.

In FIG. 12a, the pump wavelength $\lambda_p$ is located in a pass band at lower wavelengths than the stop band (i.e. $\lambda_p<\lambda_{stop1}$), here the neighboring lower pass band ($PBG_{n+1}$). In FIG. 12b, $\lambda_p$ is located in the same pass band (here $PBG_n$) as the signal wavelength $\lambda_s$. Alternatively, $\lambda_p$ may be located in any another pass band above or below $\lambda_s$. In FIG. 12c, the pump wavelength $\lambda_p$ is located in a pass band at lower wavelengths than the stop band (i.e. $\lambda_p<\lambda_{stop1}$), here the neighboring lower pass band ($PBG_{n+1}$). Alternatively, $\lambda_p$ may be located in the same pass band as the signal wavelength $\lambda_s$ or in another pass band above or below $\lambda_s$.

FIG. 13 shows four transmission spectra for fibers according to preferred embodiments the present invention suitable for core pumping. In all four examples (FIGS. 13a-13d), the transmission (in dB) versus wavelength λ (in nm) is shown. In each example, relevant ranges of pump wavelengths $\lambda_{pump}$ ($=\lambda_p$) and signal wavelengths $\lambda_{signal}$ ($=\lambda_s$) are indicated in different pass bands (photonic bandgaps) of the fiber in question.

Figure 13A:
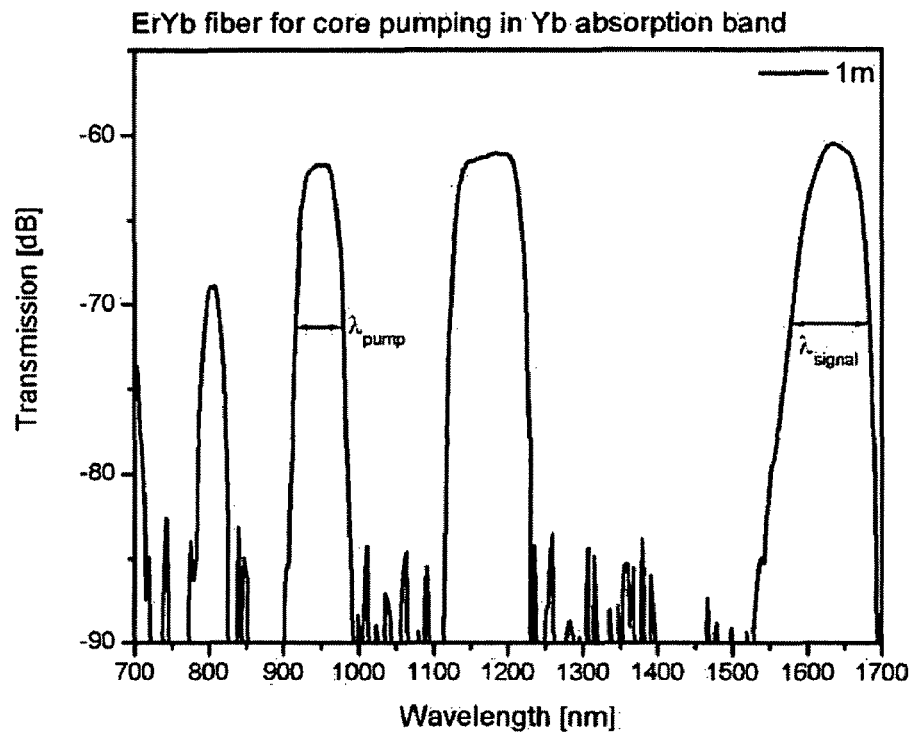
FIG. 13 shows four transmission spectra for fibers according to preferred embodiments of the present invention suitable for core pumping.

In FIG. 13a, a transmission spectrum in the wavelength range between 700 nm and 1700 nm for an ErYb-fiber of 1 m length is shown. The fiber is suitable for core pumping in the Yb absorption band (cf. e.g. FIG. 4). A pumping wavelength range between approximately 920 nm and 980 nm is indicated. The fiber may advantageously be pumped with an Yb-fiber laser operating at 975 nm. A signal wavelength range between approximately 1560 nm and 1680 nm is indicated.

Figure 13B:
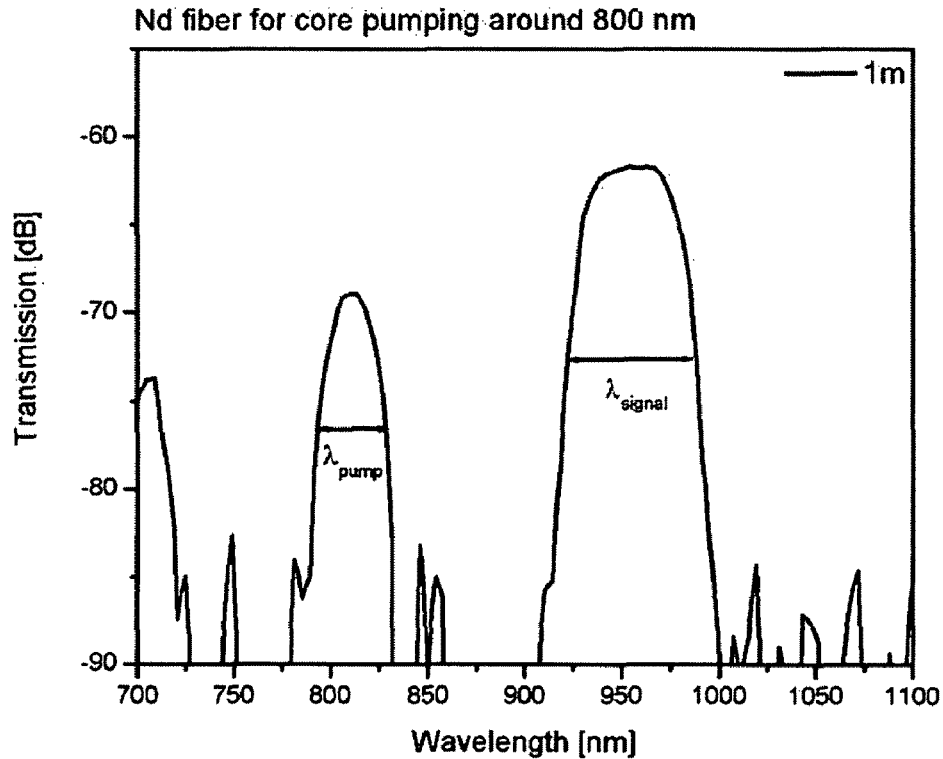

FIG. 13b shows a transmission spectrum in the wavelength range between 700 nm and 1100 nm for an Nd-fiber of 1 m length. The fiber is suitable for core pumping around 800 nm (a pumping wavelength range between approximately 790 nm and 830 nm is indicated). A signal wavelength range between approximately 920 nm and 990 nm is indicated.

Figure 13C:
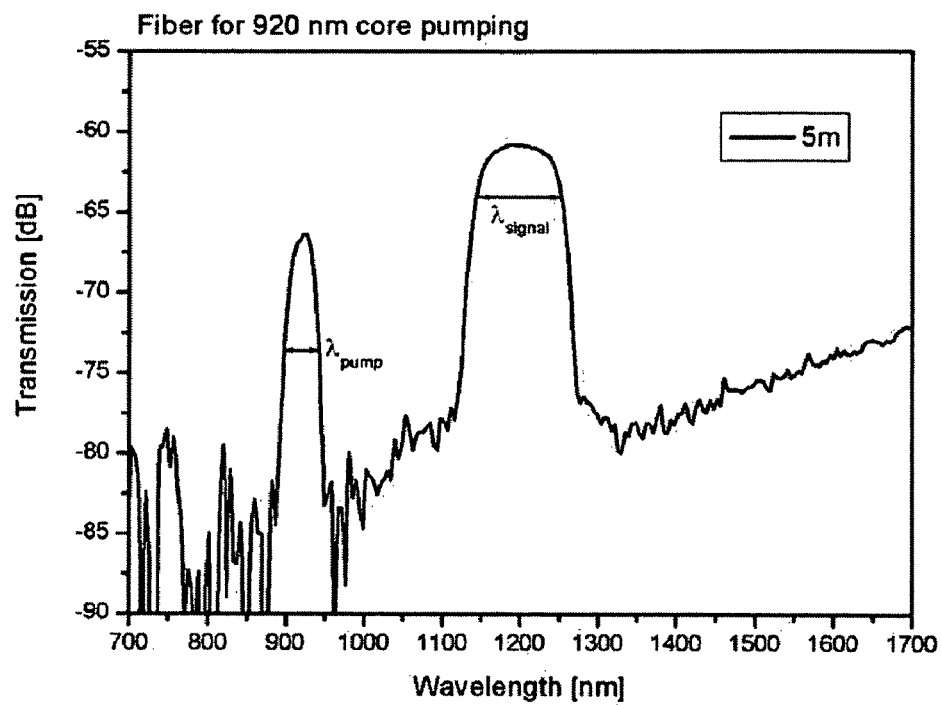

In FIG. 13c, a transmission spectrum in the wavelength range between 700 nm and 1700 nm for an Yb-fiber of 5 m length is shown. The fiber is suitable for core pumping around 920 nm (a pumping wavelength range between approximately 900 nm and 940 nm is indicated). A signal wavelength range between approximately 1140 nm and 1250 nm is indicated.

Figure 13D:
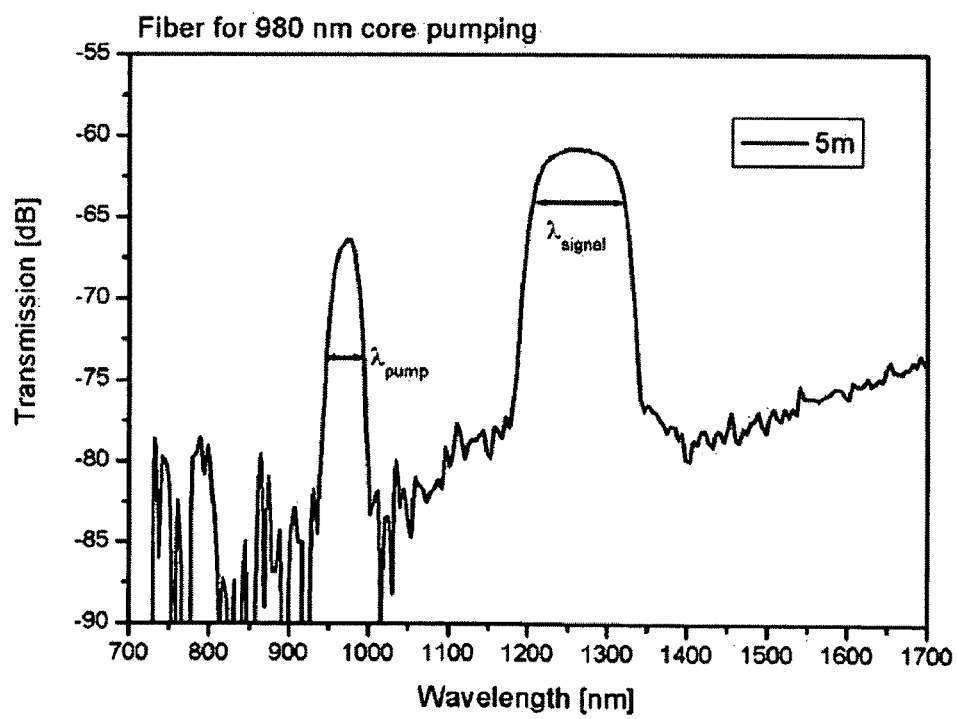

In FIG. 13d, a transmission spectrum in the wavelength range between 700 nm and 1700 nm for an Yb-fiber of 5 m length is shown. The fiber is suitable for core pumping around 980 nm (a pumping wavelength range between approximately 950 nm and 990 nm is indicated). The fiber may e.g. be pumped with an Yb fiber laser operating at 975 nm. A signal wavelength range between approximately 1200 nm and 1320 nm is indicated.

Figure 14:
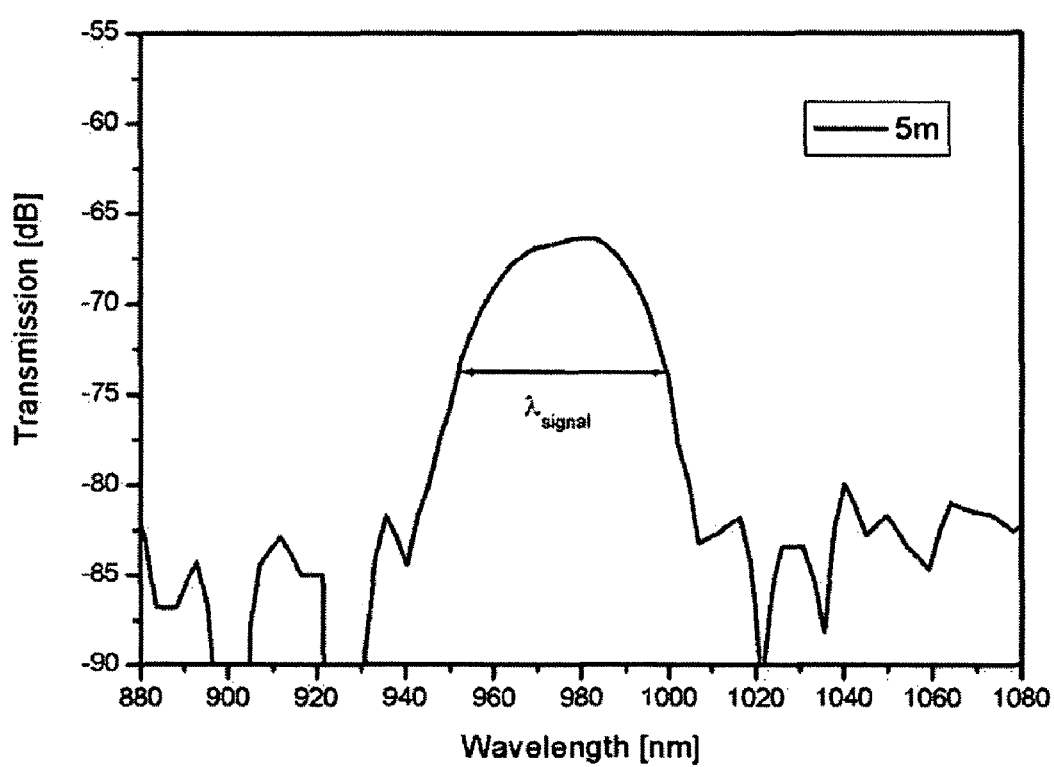
FIG. 14 shows a transmission spectrum for a fiber according to a preferred embodiment of the present invention suitable for cladding pumping.

FIG. 14 shows a transmission spectrum for a fiber according to a preferred embodiment of the present invention suitable for cladding pumping. A transmission spectrum in the wavelength range between 880 nm and 1080 nm for a fiber of 5 m length is shown. A fiber with such transmission properties can be used with Yb- or Nd-doped cores for amplification and lasing at wavelengths around 980 nm. A signal wavelength range between approximately 950 nm and 1000 nm is indicated.

FIG. 15 shows transversal cross-sections of two embodiments of an optical fiber according to a preferred embodiment of the invention comprising stress applying (SAP) elements for inducing birefringence in the optical fiber.

Figure 15A:
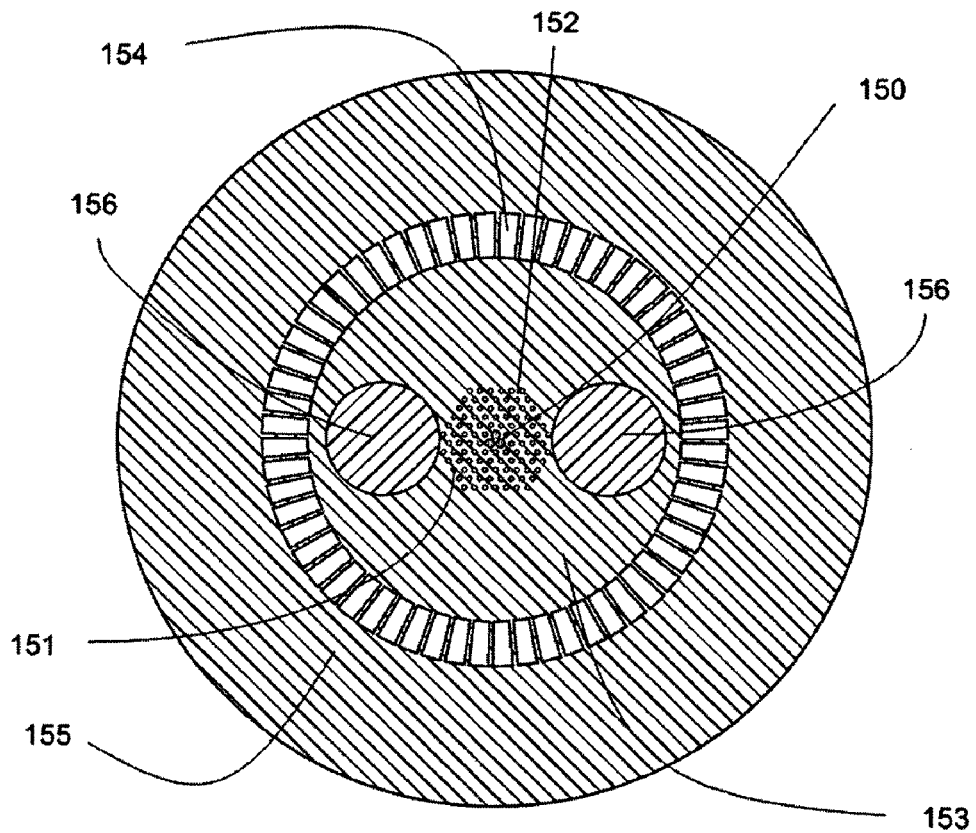
FIG. 15 shows transversal cross-sections of two embodiments of an optical fiber according to preferred embodiments of the invention comprising stress applying elements, FIG. 15a illustrating a multi cladding fiber, where a core region, surrounded by a first cladding region comprising micro-structural elements, again surrounded by a second cladding region comprising 2 oppositely located stress elements is surrounded by an intermediate air cladding region, which again is surrounded by an outer cladding region.
FIG. 15b illustrating an embodiment with a relatively large core and sixteen stress elements located adjacent to and mirror symmetrically in two groups around the centre of the core with eight in each group on each side.

FIG. 15a shows a multi cladding fiber, where a core region 150, surrounded by a first inner cladding region comprising micro-structural elements 151 embedded in a first inner cladding background material 152, the first inner cladding region being surrounded by a second inner cladding region comprising 2 stress elements 156 (oppositely located relative to the core region 150) embedded in a second inner cladding background material 153, the second inner cladding region being surrounded by a first outer (air) cladding region 154, which again is surrounded by a second outer cladding region 155 (e.g. an overcladding, e.g. of solid silica). Because of the low effective index of the air cladding 154, the inner cladding 151, 152, 153, 156 forms a multimode waveguide with a very high numerical aperture. Hence, the inner cladding may guide light with a high brightness, e.g. launched from a multimode laser pump diode.

The double cladding fiber in FIG. 15a may advantageously form part of a laser or an amplifier. Because of the SAP regions 156 around the fiber core 150, the output of the laser or amplifier may be adapted to have a well-defined polarization state. This is a desired property, e.g. for polarization multiplexing of two laser outputs or for generation of higher harmonics of the output wavelength in a non-linear crystal. The fiber core 150, here shown to posses 3-fold rotational symmetry, may be fabricated from a preform having three centrally located solid rods surrounded by appropriate cladding elements, stress elements, etc. The embodiment resembles the design in FIG. 7, only including the two SAP elements 156 in the second inner cladding region (73 in FIG. 7) and having a core region 150 with 3-fold rotational symmetry.

In another embodiment of the invention (as exemplified in FIG. 15b), birefringence is induced by replacing micro-structural elements with stress applying material (in the form of individual stress elements), e.g. two or more than two, such as six, or sixteen or forty eight micro-structural elements. Preferably, the stress elements should be placed in a mirror symmetric way, e.g. in a two-fold symmetry around the centre of the core and as close to the core as possible. When viewed in a cross section perpendicular to the longitudinal direction of the fiber, a stress element or a group of stress elements has an inner side substantially facing the core region and an outer side substantially facing away from said core region. In an embodiment, the micro-structural elements of the cladding region are arranged in such a way that no micro-structural elements are located along the outer side of a stress element or a group of stress elements.

Figure 15B:
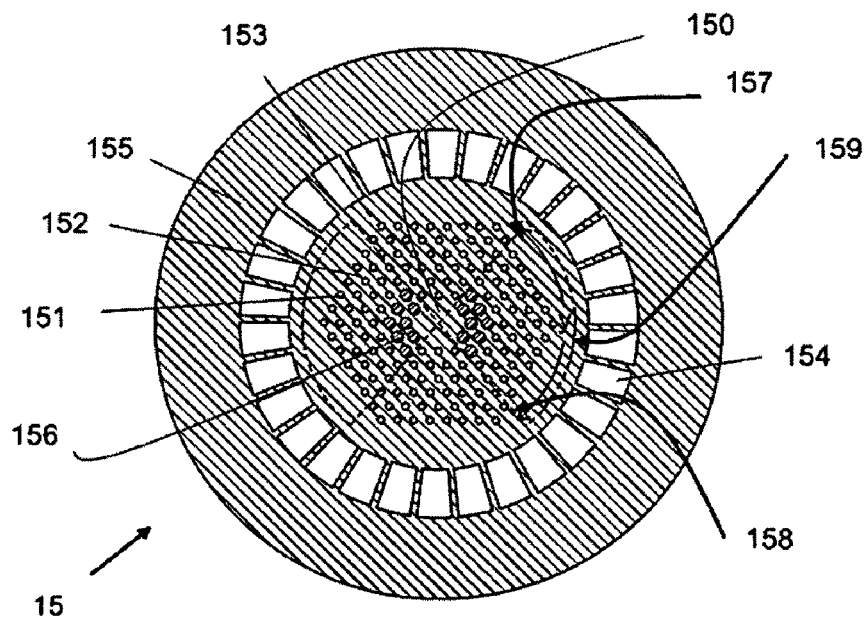

FIG. 15b illustrates an embodiment with a relatively large core 150 (e.g. formed by replacing a number of (e.g. seven) centrally located micro-structural elements with silica doped with an optically active material) and sixteen stress elements 156 located in the first inner cladding region (otherwise comprising micro-structural elements 151 embedded in a first inner cladding background material 152) adjacent to and mirror symmetrically in two groups around the centre of the core 150 with eight in each group on each side. In this design, the structure shown in FIG. 6 is surrounded by an air-cladding 154 and a further outer cladding region 155, to form a double-cladding fiber. The advantage of replacing some of the micro-structural elements 151 of the first inner cladding region with SAPs 156 is that for a fixed core size a smaller inner cladding diameter may be realized compared to the design shown in FIG. 15a (because the second inner cladding region 153 may have a (smaller) dimension that is NOT determined by the (relatively more distant and hence relatively larger) SAP-elements). Consequently, a higher pump absorption coefficient may be obtained for the design in FIG. 15b compared to the design in FIG. 15a.

If the stress elements are placed in a two-fold symmetry around the core (as is the case in FIG. 15b), it is possible to draw two mirror symmetric wedges (indicated by lines 157, 158 in FIG. 15b) that contain all stress elements 156 and has a common top point in the centre of the core 150. The smallest opening angle y of the wedges (cf. 159 in FIG. 15b) should preferably not exceed 90 degrees; otherwise some of the stress elements 156 partly cancel the effect of the others on the birefringence.

The formation of micro-structured optical fibers comprising stress applying elements is e.g. described in WO-2005/059612.

Figure 16:
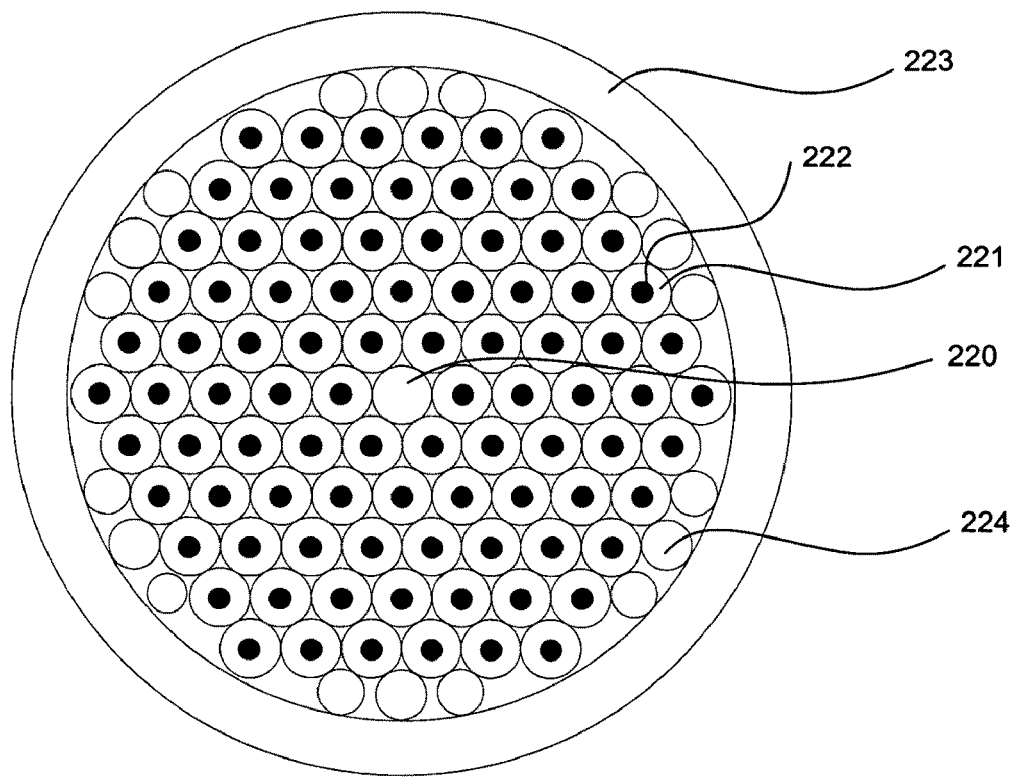
FIG. 16 schematically shows an example of a preform for fabrication of a fiber according to a preferred embodiment of the present invention.

In order to fabricate fibers according to preferred embodiments of the present invention, methods well known for fabrication of micro-structured fibers or fibers with multiple cores may be employed with modification feasible for a person skilled in the art of fabricating micro-structured fibers—see for example Patent Abstracts of Japan, appl. no. 06-250491; Patent Abstracts of Japan, appl. no. 58-090313; Patent Abstracts of Japan, appl. no. 55-117209; Patent Abstracts of Japan, appl. no. 54-081518; U.S. Pat. No. 5,155,792; WO-02/26648, U.S. Pat. No. 5,471,553. A number of these methods are based on stacking of rods or canes to form a preform and drawing this into fiber using a conventional drawing tower. An example of a preform for a fiber according to a preferred embodiment of the present invention is illustrated in FIG. 16. The preform comprises a pure silica rod 220 (doped with an optically active material suitable for amplifying an optical signal, optionally further doped with a photosensitive material) that will form the core. This rod is surrounded by a number of silica rods 221 comprising a Ge-doped inner part 222 that will form the 2D periodic structure of the inner cladding region. The stack of rods is placed in an overcladding tube 223. The preform may further comprise various types of filling/stuffing/buffer elements, such as for example rods 224. The overcladding tube usually acts as an outer cladding region providing a desired outer diameter of the final fiber as well as mechanical robustness of the fiber. Other types of outer claddings are also covered by the present invention, such as outer claddings comprising an air-clad layer and a solid part—as for example described in U.S. Pat. No. 5,907,652 (see also this reference for further information on drawing optical fibers with micro-structured features). During fiber drawing, a lower than atmospheric pressure may be applied inside the overcladding tube in order for the small interstitial voids between the rods to collapse. In this manner, the rods will form a close packed, 2D periodic arrangement. The use of pressurization of voids in preform capillary tubes or between preform elements during manufacturing to control the cross-sectional structure of the drawn fiber is e.g. discussed in WO-03/080524. The preform in FIG. 16 comprises a relatively low number of periods surrounding the core (corresponding to five layers). Preferably, a larger number of layers is employed in order to reduce various loss mechanisms. The preform may preferably be processed prior to fiber drawing where the preform is for example placed in a lathe and heated to a temperature such that the overcladding tube collapses and fixates the rods. The method of stacking rods may also be applied, using appropriate modifications, to other material systems, such as for example polymers.

Figure 17:
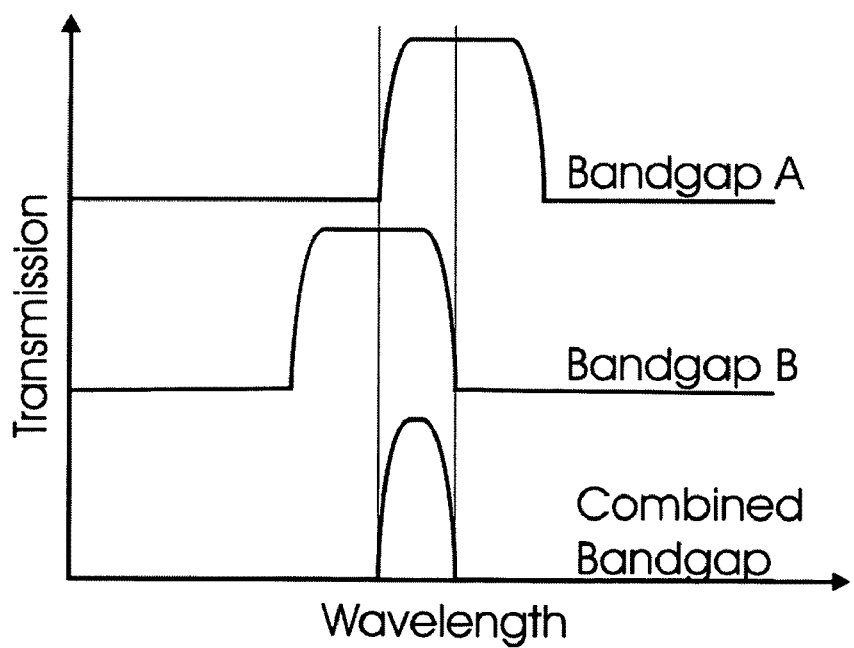
FIG. 17 shows schematic graphs of transmission versus wavelength for radial directions A and B and their 'combined' effect in the core of an optical fiber according to an embodiment of the invention.

Photonic Bandgap Fibers with Different Guiding Properties in Different Radial Directions of a Cross Section of the Fiber:

If a narrow bandwidth is required for certain applications, the narrow bandwidth can be achieved by having different photonic bandgaps in different directions of the fiber. The operation of such a fiber is indicated in FIG. 17 showing schematic graphs of transmission versus wavelength for radial directions A and B and their 'combined' effect in the core of the optical fiber. The bandgaps of the cladding in directions A and B are indicated as 'Bandgap A' and 'Bandgap B', respectively. The core can only support a mode that is confined in both the A and B directions. The resulting band where the mode is supported is shown in FIG. 17 as the 'Combined bandgap'.

The change in bandgap to provide an optical fiber having different guiding properties in different radial directions of a cross section of the fiber can be implemented in several ways, including A. Changing the pitch differently in different radial directions; B. Changing the cross-sectional size of the micro-structural elements (e.g. up-doped regions) over the cross section of the fiber; and C. Changing the refractive index of the micro-structural elements (e.g. up-doped regions) over the cross section of the fiber.

Figure 18:
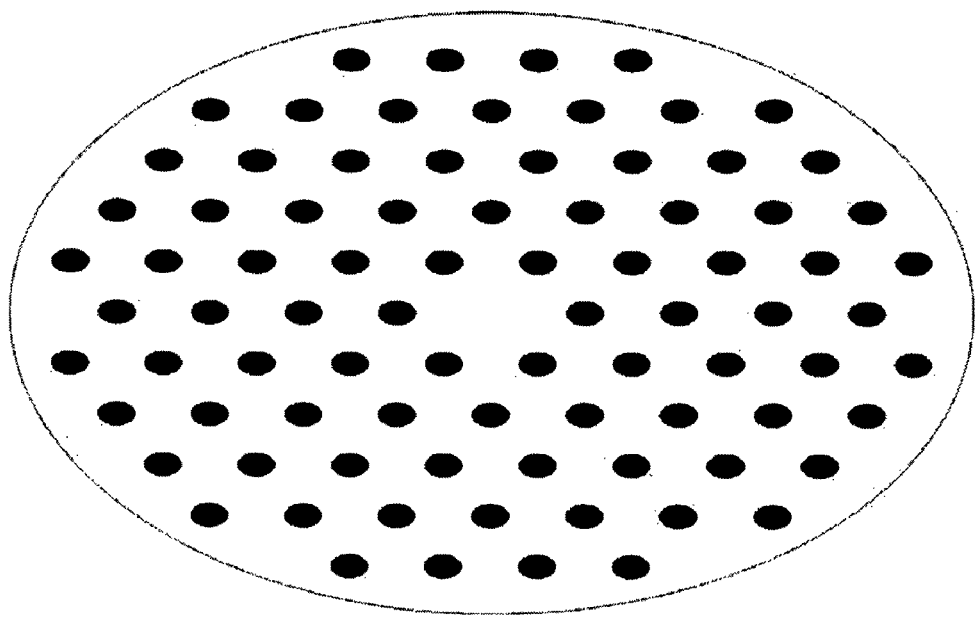
FIG. 18 shows a cross-sectional view of an optical fiber with a deformed periodic arrangement of micro-structural elements for inducing different photonic bandgaps in different directions of the fiber.

A. Change of pitch: One possible method is to deform a standard solid core PBG fiber as indicated in FIG. 18 by the elongate (here elliptical) cross section of the optical fiber. This can e.g. be achieved drawing the fiber from an oval preform resulting in a substantially circular fiber with distorted cladding features. Alternatively, pressure control of the voids between the outer part of the solid preform cladding elements and/or of the voids of the capillary tubes during fabrication can be used.

Figure 19:
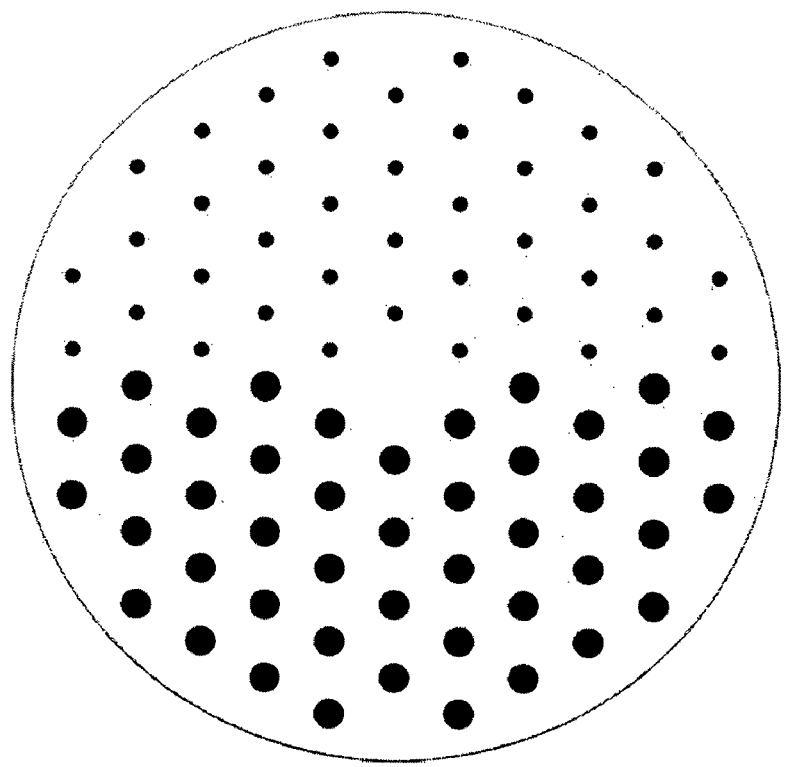
FIG. 19 shows an optical fiber comprising periodically arranged micro-structural elements of different size in a cross section of the fiber.

B. Change of size: An example of an optical fiber comprising periodically arranged micro-structural elements of different size in a cross section of the fiber is shown in FIG. 19. Here elements of two different diameters (but the same pitch) are shown, each size of element being distributed on their separate half of the circular cross section of the optical fiber. More than two different sizes (optionally having different pitches) may be present among the micro-structural elements and other distributions in the cross section can be used.

Figure 20A:
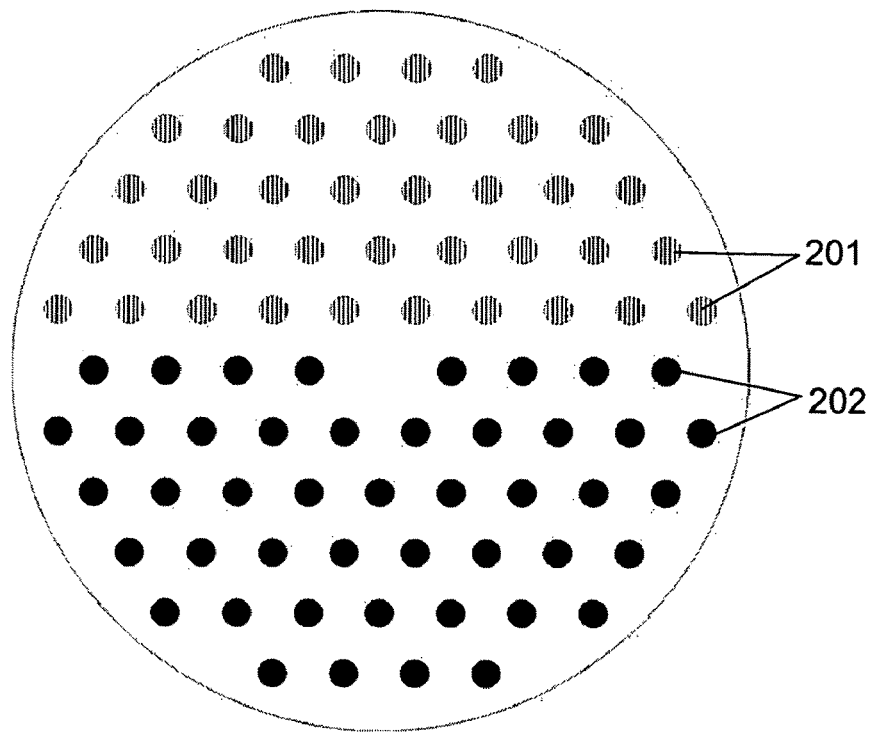
FIGS. 20a and 20b show two examples of optical fibers comprising periodically arranged micro-structural elements of different refractive indices in a cross section of the fiber.
Figure 20B:
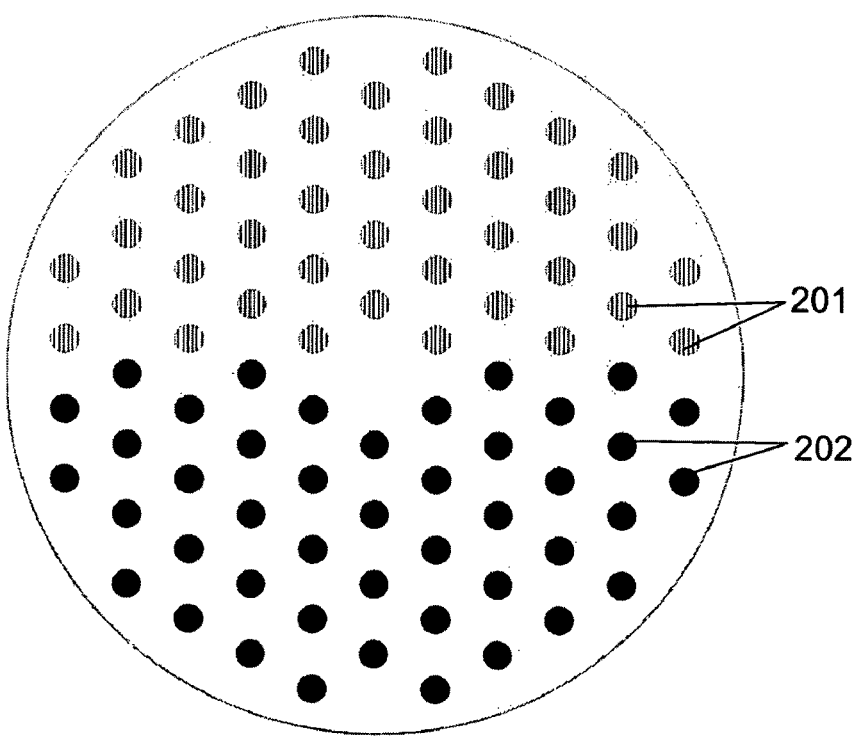

C. Change of refractive index: Examples of optical fibers comprising periodically arranged micro-structural elements of different refractive indices in a cross section of the fiber are shown in FIGS. 20*a* and 20*b*. Here elements of equal diameters having two different refractive indices are shown, elements of equal refractive index being substantially distributed on their separate half of the circular cross section of the optical fiber indicated by reference numeral 201 and by 202. FIGS. 20*a* and 20*b* have the same periodic arrangement of the micro-structural elements (triangular) but differ in the cross-sectional arrangement of the two element types of different refractive indices. More than two different refractive indices may be present among the micro-structural elements and other distributions in the cross section can be used (cf. e.g. FIG. 21*b*). Other periodic arrangements of the micro-structural elements than shown in FIG. 20 can be used.

Other methods and combinations with and of the above methods may be used to implement specific locations of and widths of transmission bands. For example, it is possible by tapering of one or more fiber sections to tailor the transmission spectrum. As known to those skilled in the art of PBG fibers, transmission properties can be tailored by adjusting spacing of micro-structural elements.

In a preferred embodiment, two sections of PBG fiber are optically connected, wherein the pass-band of said two sections overlap in a narrow spectral range of 100 nm or less, such as smaller than 50 nm, such as smaller than 30 nm, such as smaller than 10 nm, such as smaller than 5 nm, such as smaller than 1 nm, such as smaller than 0.5 nm, such as smaller than 0.1 nm.

Such narrow pass-bands are important for suppression on non-linear effects and/or amplification at undesired wavelengths.

Preferably, the optical connection is provided by splicing two separate PBG fibers to each other. Alternatively, the optical connection is provided by tapering at least one section of a PBG fiber.

Preferably, at least one of the two sections of PBG fiber is an optical fiber according to a preferred embodiment of the present invention.

Figure 21A:
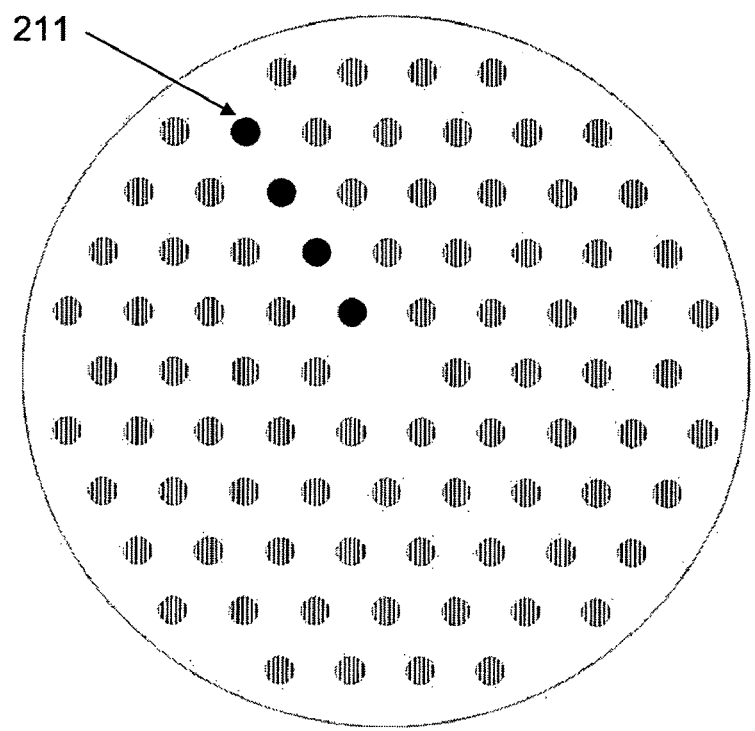
FIG. 21 shows two other examples of optical fibers comprising periodically arranged micro-structural elements of different refractive indices in a cross section of the fiber, in FIG. 21a the difference being in a single radial direction, and in FIG. 21b the difference being between three regions of the cross section.
Figure 21B:
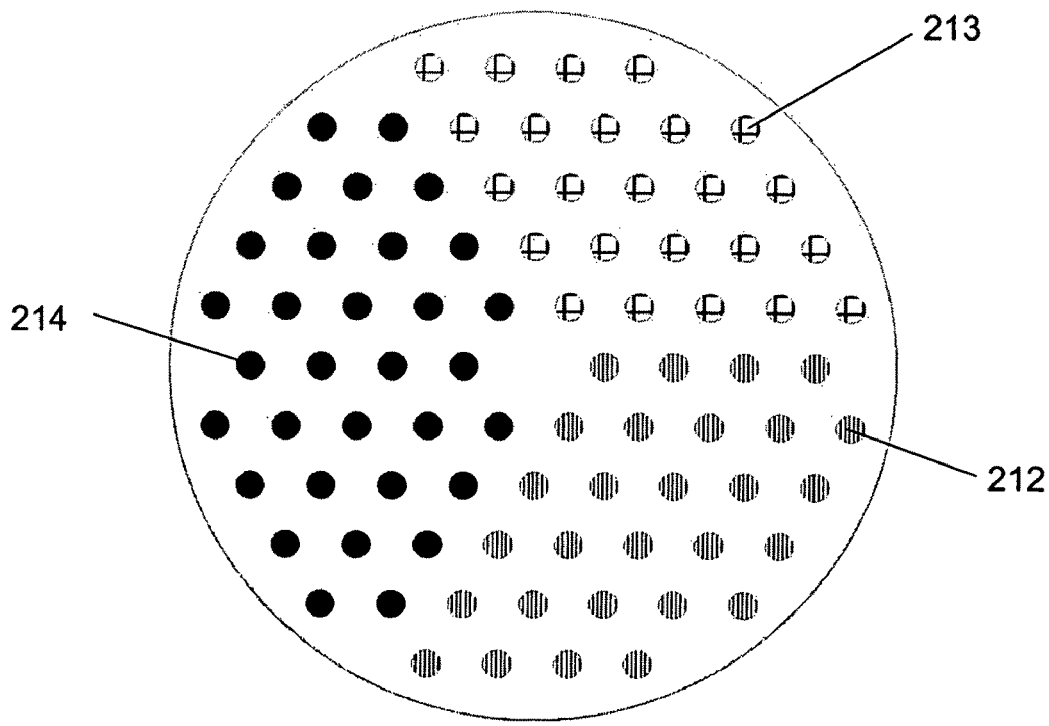

Changing the bandgap in different directions of the cross section will change the dispersion of the fiber. One way of tailoring the dispersion of the fiber would be to change the relative portion of the cladding with different bandgaps. Different examples of this are implemented by the fibers shown in FIGS. 20 and 21*a*. FIG. 21*a* shows an optical fiber comprising periodically arranged micro-structural elements in a cross section of the fiber. In a single radial direction 211, micro-structural elements having a refractive index different from the rest of the elements are shown. The single row of (e.g. up-doped) micro-structural elements having a refractive index different from the rest acts as a line-defect in an otherwise 2D-periodic arrangement of elements (e.g.) to provide confinement of light (i.e. here leak of light from the core). Further tailoring can be made by including several cladding regions with different bandgaps as shown in FIG. 21*b*, where three different regions (here each occupying substantially one third of the circular cross section of the fiber and indicated by three different filling patterns referred to by reference numerals 212, 213, and 214, respectively) each comprising micro-structural elements of equal refractive index but different from region to region are shown.

Figure 22A:
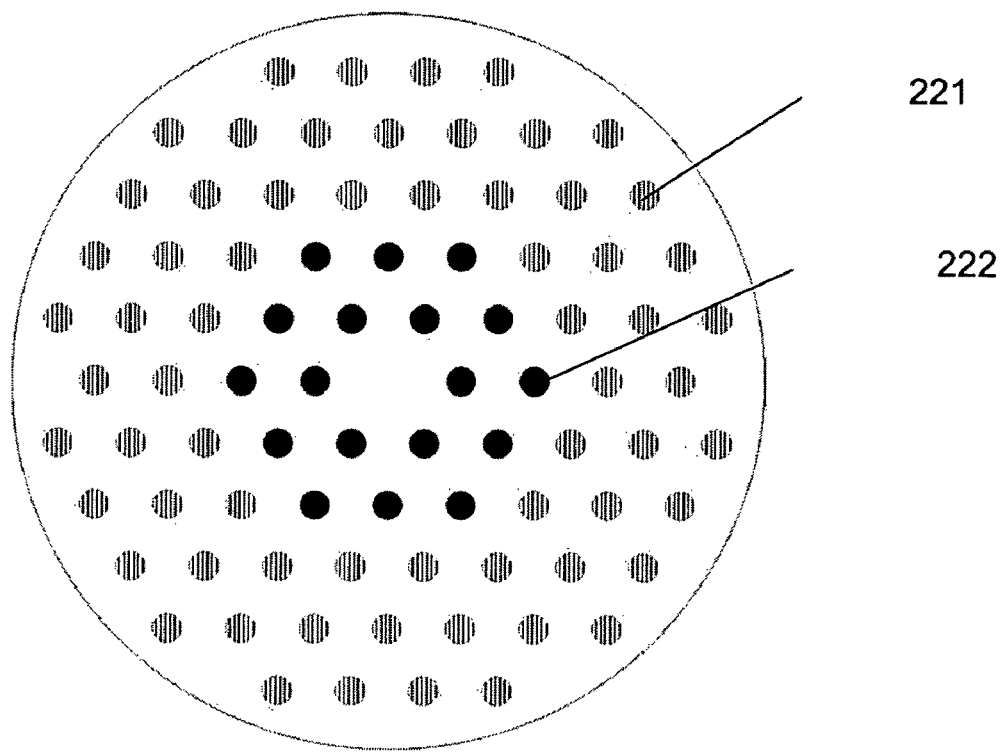
FIG. 22a shows another example of an optical fiber comprising periodically arranged micro-structural elements of different refractive indices in a cross section of the fiber, the difference being implemented in concentric rings around the core
Figure 22B:
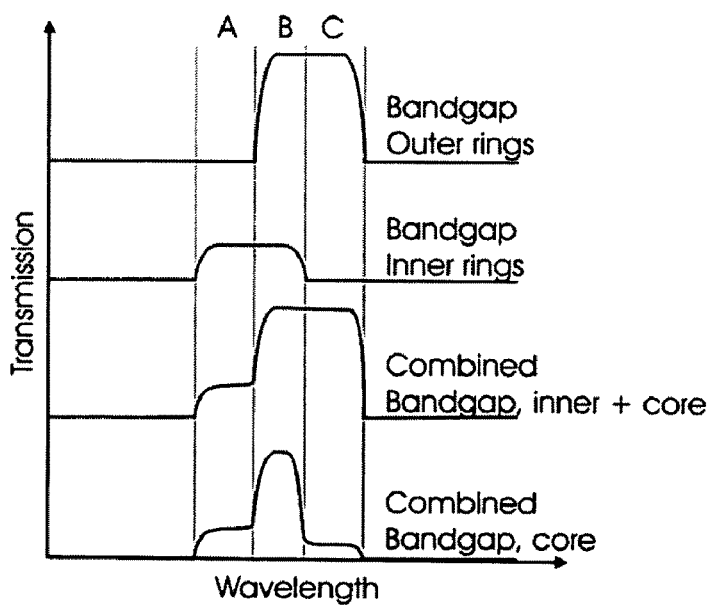
FIG. 22b shows schematic graphs of transmission versus wavelength for the different rings and their 'combined' effect for light inside the outer rings (second lowest curve) and their 'combined' effect for light in the core (lowest curve).

Another way of tailoring the bandgap is to make rings of micro-structural elements with different bandgaps, cf. FIG. 22*a*. In this case the ring closest to the core (here comprising 2 layers of micro-structural elements 222) has a "leaking" bandgap enclosed by a ring with a well defined bandgap (here shown to have 3 layers of micro-structural elements 221). The bandgaps of the different rings are indicated in FIG. 22*b* (cf. also explanation to FIG. 17), where the top graph indicates the bandgap of the outer rings of micro-structural elements ('Bandgap Outer rings'), the graph second from the top indicates the bandgap of the inner rings of micro-structural elements ('Bandgap inner rings'), whereas the total confining bandgap of the inner rings plus the core region is shown in the graph second from the bottom as the 'Combined bandgap, inner+core' and the total confining bandgap of the core region itself is shown in the bottom graph as the 'Combined bandgap, core'. The mode in this structure has three windows of operation indicated by A, B and C. In range A the mode is poorly confined and has high losses. In range B the mode is confined to the core and has low losses. In range C the mode is confined in the large area of the core plus the inner ring, probably very multi-moded. The window of operation is preferably window B.

Figure 23A:
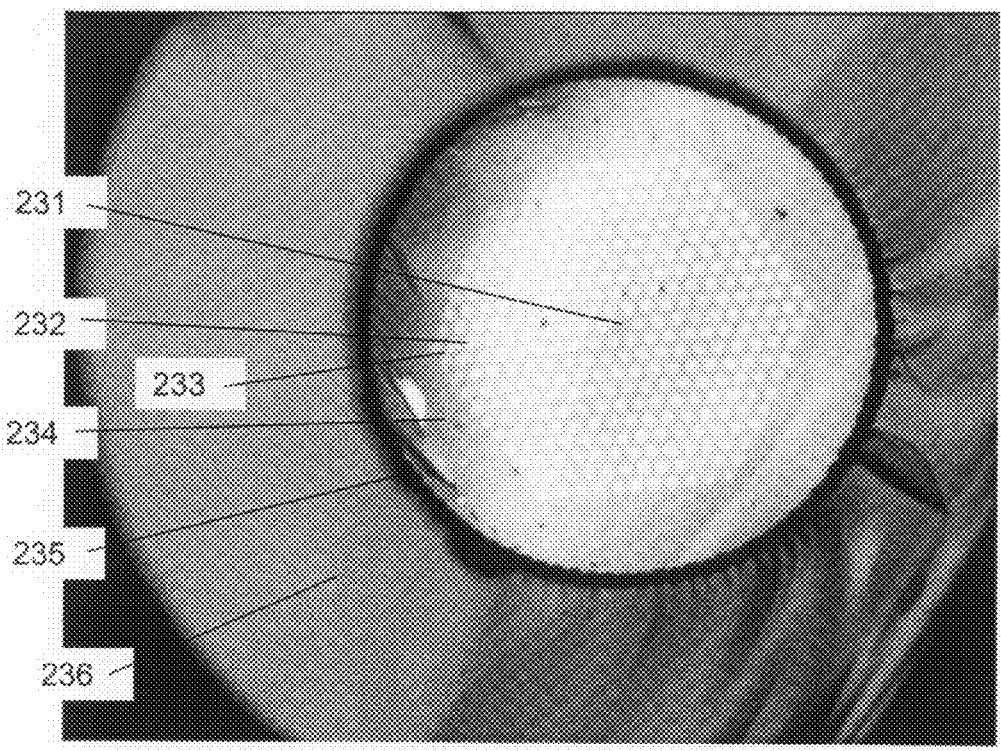
FIG. 23a shows a photomicrograph of an optical for amplifying light and FIG. 23b a corresponding transmission spectrum for the fiber.
Figure 23B:
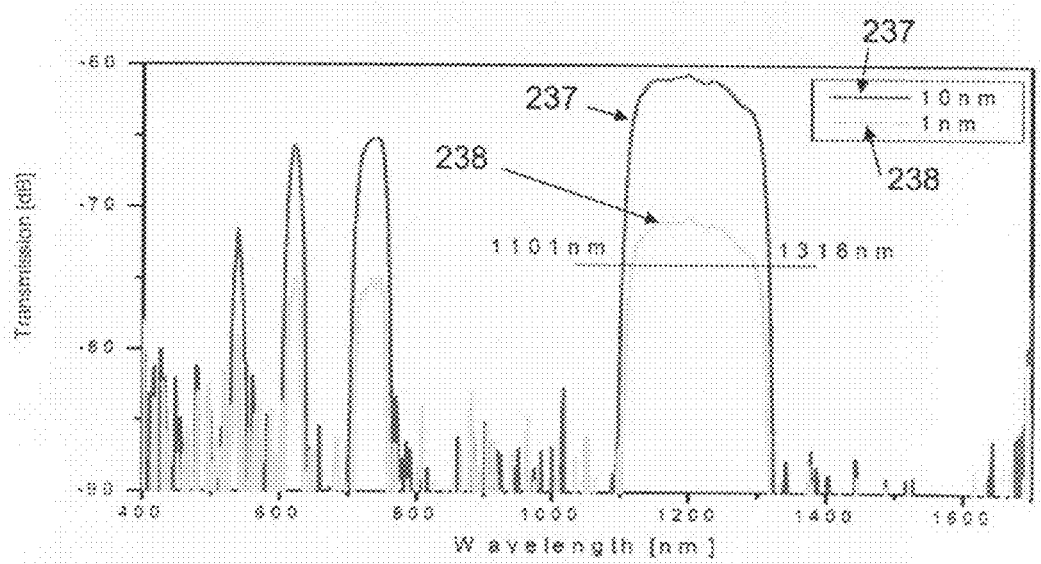

FIG. 23*a* shows a photomicrograph of a double cladding optical fiber for amplifying light comprising Yb as an active material in the core 231 and an air cladding 235 for confining pump light to the inner cladding. The inner cladding surrounding the core region comprises an arrangement of longitudinally extending solid high-index micro-structural elements 232 embedded in an inner cladding background matrix material 233 and distributed in the cross-section in a manner to create a photonic bandgap effect for light guided in the core as illustrated by the corresponding transmission spectrum of FIG. 23b from 400 nm to 1700 nm for the fiber for two different spectral resolutions of the spectrum analyzer (10 nm (graph 237) and 1 nm (graph 238), respectively). Several pass bands are shown, the broadest pass band extending from 1101 nm to 1318 nm. The optical fibre further comprises two solid cladding regions 234, 236 comprising no micro-structural elements in the form of second inner cladding region 234 extending between the micro-structured part of the inner cladding and the air-cladding and outer cladding region 236 surrounding the air-cladding, respectively.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims. For example other optically active ions than rare-earth ions may be used, e.g. transition metals.

REFERENCES

J. F. Digonnet, ed. Rare-Earth-Doped Fiber Lasers and Amplifiers. Marcel Dekker, Inc., New York-Basel. $2^{nd}$ edition, 2001

Bjarklev, Broeng, and Bjarklev. Photonic crystal fibres. Kluwer Academic Press, 2003

Argyros et al. Guidance properties of low-contrast photonic bandgap fibres. Optics Express, Vol. 13, No. 7, 4 Apr. 2005, pp. 2503-2511

WO-03/019257 (Crystal Fibre) Mar. 6, 2003

Bouwmans et al. Fabrication and characterization of an all-solid 2D photonic bandgap fiber with a low-loss region (<20 dB/km) around 1550 nm. Optics Express, Vol. 13, No. 21, 17 Oct. 2005, pp. 8452-8459

WO-03/079077 (Crystal Fibre) Sep. 25, 2003

WO-99/64904 (Broeng et al.) Dec. 16, 1999

WO-00/60388 (The Secretary of State for Defense, GB) Oct. 12, 2000

Govind R Agrawal Fiber-Optic Communication Systems, 2nd edition, John Wiley & Sons Inc., 1997, page 380-381

WO-02/101429 (Crystal Fibre) Dec. 12, 2002

Barnes et al. Absorption and Emission Cross Section of $Er^{3+}$ Doped Silica Fibers. IEEE J. of Quantum Electronics, Vol. 27, No. 4, 1991, pp. 1004-1010

WO-98/36300 (Ionas, Lucent Technologies) Aug. 20, 1998

WO-021088802 (Blazephotonics) Nov. 7, 2002

WO-2005/059612 (Crystal Fibre) Jun. 20, 2005

JP-08-119656 (Shin Etsu Chem Co) May 14, 1996 (Patent Abstracts of Japan, appl. no. 06-250491)

JP-59-217632 (Furukawa Electric Co Ltd) Dec. 7, 1984 (Patent Abstracts of Japan, appl. no. 58-090313)

JP-57-041602 (NTT) Mar. 8, 1982 (Patent Abstracts of Japan, appl. no. 55-117209)

JP-56-006202 (NTT) Jan. 22, 1982 (Patent Abstracts of Japan, appl. no. 54-081518)

U.S. Pat. No. 5,155,792 (Hughes Aircraft) Oct. 13, 1992

WO-02/26648 (Schott Comm Technologies Inc) Apr. 4, 2002

U.S. Pat. No. 5,471,553 (Asahi Chemical Ind) Nov. 28, 1995

U.S. Pat. No. 5,907,652 (Lucent Technologies) May 25, 1999

WO-03/080524 (Blazephotonics) Oct. 2, 2003

The invention claimed is:

1. An optical fiber defining a longitudinal direction, the optical fiber comprising
   a core region comprising a core region material comprising an active material consisting of a single chemical element, the active material being capable of generating stimulated emission at a desired signal wavelength, $\lambda_s$, and
   a cladding region surrounding said core region, said cladding region comprising solid, relatively high-index micro-structural elements embedded in a relatively low-index cladding background material, said micro-structural elements extending in said longitudinal direction, and said cladding region is adapted to reduce and/or inhibit propagation in said core region for a wavelength, $\lambda_{ASE}$,
   wherein
   $\lambda_{ASE}$ is different from $\lambda_s$, and an emission cross-section $\sigma_E$ of an atom of said active material when located in said core region material is larger at $\lambda_{ASE}$ than at $\lambda_s$.

2. The optical fiber of claim 1 wherein said fiber is being adapted to guide light by the photonic bandgap effect and to have one or more pass bands and at least one stop-band over a wavelength range from $\lambda_{stop1}$ to $\lambda_{stop2}$ and said emission cross-section $\sigma_E$ at $\lambda_{ASE}$ is larger than outside $\lambda_{stop1}$ to $\lambda_{stop2}$.

3. The optical fiber according to claim 2 wherein $\lambda_s$ is located in a pass band in that $\lambda_s$ is smaller than $\lambda_{stop1}$ or $\lambda_s$ is larger than $\lambda_{stop2}$.

4. An optical amplifier or laser, comprising
   a) an optical pump source which operates at a wavelength, $\lambda_p$, and with an average power that exceeds 5 W,
   b) an active optical fiber defining a longitudinal direction, the optical fiber comprising a core region comprising a core region material comprising an active material consisting of a single chemical element, the active material being capable of generating stimulated emission at a desired signal wavelength, $\lambda_s$, and a cladding region surrounding said core region, said cladding region comprising solid, relatively high-index micro-structural elements embedded in a relatively low-index cladding background material, said micro-structural elements extending in said longitudinal direction, and said cladding region is adapted to reduce and/or inhibit propagation in said core region for a wavelength, $\lambda_{ASE}$,
   c) a coupling device providing pump light from said optical pump source to said active optical fiber, and
   d) wavelength-selective means to ensure amplification or lasing at a signal wavelength, $\lambda_s$.

5. The optical fiber according claim 2 wherein the difference between the emission cross section $\sigma_E$ at a wavelength in a stop band is at least 50% larger than at the signal wavelength $\lambda_s$.

6. The optical fiber according claim 2 wherein the wavelength $\lambda_{ASE}$ is substantially equal to the wavelength of maximum emission cross section $\sigma_E$ in the stop band.

7. The optical fiber according claim 1 wherein $\lambda_s$ is in the range from 970 nm to 1030 nm.

8. The optical fiber according to claim 1 wherein $\lambda_s$ is in the range from 1070 nm to 1300 nm.

9. The optical fiber according claim 1 wherein $\lambda_s$ is in the range from 1450 nm to 1700 nm.

10. The optical fiber according claim 1 wherein the optical fiber is a double-clad fiber.

11. The optical fiber according claim 1 wherein the optical fiber comprises at least one tapered end.

12. The optical fiber according claim 1 wherein said core region comprises rare earths dopant ions.

13. The optical amplifier or laser according to claim 4 wherein the transmission of the optical fiber in a stop band is at least 10 dB/m lower than the transmission of the optical fiber in a transmission band.

14. An optical amplifier or laser according to claim 4 wherein said wavelength selective means are selected from the group consisting of: a seed-laser, fiber Bragg gratings, external metal coated mirrors, and external dielectric mirrors and combinations thereof.

15. An optical amplifier or laser according to claim 4 wherein $\lambda_s$ is separated spectrally from the range $\lambda_{stop1}$ to $\lambda_{stop2}$ by less than the Raman shift.

* * * * *